United States Patent
Nurmi et al.

(10) Patent No.: US 7,783,821 B2
(45) Date of Patent: Aug. 24, 2010

(54) METHOD AND DEVICE FOR MAPPING SIGNAL ORDER AT MULTI-LINE BUS INTERFACES

(75) Inventors: Juha H-P Nurmi, Salo (FI); Jussi Koskela, Kaarina (FI)

(73) Assignee: Nokia Corporation, Espoo (FI)

( * ) Notice: Subject to any disclaimer, the term of this patent is extended or adjusted under 35 U.S.C. 154(b) by 169 days.

(21) Appl. No.: 11/762,532

(22) Filed: Jun. 13, 2007

(65) Prior Publication Data

US 2008/0313382 A1   Dec. 18, 2008

(51) Int. Cl.
    G06F 13/36    (2006.01)
(52) U.S. Cl. .............. 710/315; 710/301; 713/100; 370/395.3; 370/395.31
(58) Field of Classification Search ............ 710/314, 710/316, 315
    See application file for complete search history.

(56) References Cited

U.S. PATENT DOCUMENTS

| | | | | |
|---|---|---|---|---|
| 5,299,193 A | * | 3/1994 | Szczepanek | ............ 370/463 |
| 5,991,866 A | * | 11/1999 | Heller et al. | ............ 712/10 |
| 6,845,461 B1 | | 1/2005 | Kim | |
| 7,240,141 B2 | * | 7/2007 | Ning et al. | ............ 710/309 |
| 7,331,022 B1 | * | 2/2008 | Pritchard et al. | ............ 716/3 |
| 2003/0126331 A1 | | 7/2003 | Levy | |
| 2005/0149648 A1 | | 7/2005 | Chiang | |
| 2006/0190655 A1 | * | 8/2006 | Kautzman et al. | ......... 710/306 |

OTHER PUBLICATIONS

International Preliminary Report on Patentability for PCT/EP2008/004633 dated Dec. 17, 2009.
International Search Report for Appl. No. PCT/EP2008/004633 mailed Oct. 31, 2008.

* cited by examiner

*Primary Examiner*—Henry W. H. Tsai
*Assistant Examiner*—Elias Mamo
(74) *Attorney, Agent, or Firm*—Alston & Bird LLP

(57) ABSTRACT

The present invention provides methods and modules allowing for mapping of interface signals at for instance multi-line buses. A mapping of internal signal order schemes to external signal order schemes is enabled such that upon configuration any interface signals may carried on any lines of a multi-line bus. The configurability may obtained by the implementation of mapping logics and mapping algorithms, which associates external interface terminal to signal association to internal interface terminal to signal association in a configurable manner.

16 Claims, 11 Drawing Sheets

State of the Art

State of the Art

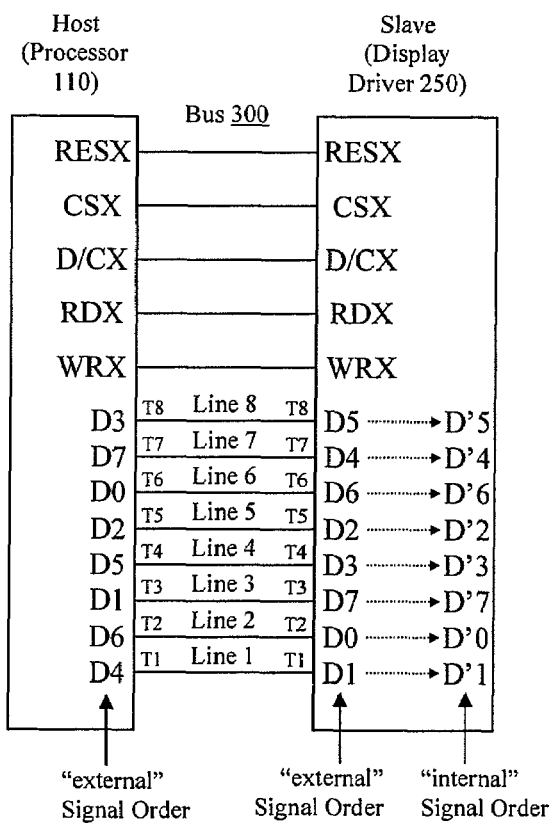
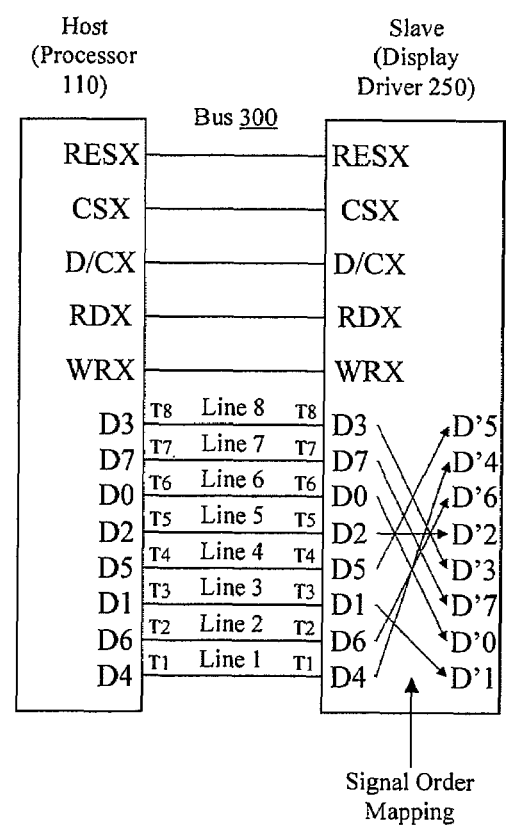
Fig. 8a
Fig. 8b

METHOD AND DEVICE FOR MAPPING SIGNAL ORDER AT MULTI-LINE BUS INTERFACES

FIELD OF THE INVENTION

The exemplary embodiments of this invention relate to the field of electronic devices. In particular, the exemplary embodiments of this invention relate to interface connectivity to multi-line buses with varying signal ordering.

BACKGROUND

Electronic devices are often implemented of modular components, which are interconnected through several electrical conductors carrying specific signal. These electrical conductors are known as buses. Although, the signals of interfaces coupled to buses interconnecting modules in electronic device are conventionally well-defined or standardized the actual terminal arrangement of electronic components which provide the interface signals differ. Developers of electronic devices face several problems during layout of the wiring such as issues due to electromagnetic designs, interferences, cross talking and the like. The complexity of these problems is increasing when the wiring layout of an electronic device requires several crossing lines for enabling connectivity of different modules via parallel multi-line buses. Moreover, wiring layouts with crossing line requires the use of multi-layer printed wiring boards (PWB), which are const intensive in development and production. Furthermore, a once designed wiring layout is specific to certain terminal arrangements of electronic components, which prevents from implementing alternative electronic components having the same functionality but differing in terminal layout.

Hence, the need is given to provide a solution, which allows implementing interfaces independent from the actual terminal arrangement of the different interface signals on side of the electronic component.

SUMMARY

According to an aspect of one exemplary embodiment of this invention, a method of signal mapping is provided. Mapping parameters are received through a first bus interface coupled to a multi-line bus. The mapping parameters allow for identifying which signals are transmitted on at least a part of lines of the multi-line bus. The first bus interface asserts different interface signals including control signals and data signals on different bus lines. Several signals may be asserted on the multi-line bus via interface signal terminal at the same time. The first bus interface expects to receive asserted signals in a first signal order scheme, which defines a relationship between lines of the multi-line bus and interface signals and interface signal terminals of the first bus interface, respectively. Signals received via the multi-line bus from a second bus interface are detected and the detected signals have a second signal order scheme which is used by the second bus interface. Analogously, the second signal order scheme defines a relationship between lines of the multi-line bus and interface signals and interface signal terminals of the second bus interface, respectively. The detected signals are mapped in accordance with the mapping parameters in that the detected signals are rearranged, which results in rearranged signals, which are in conformity with the first signal order scheme.

According to an exemplary embodiment of the present invention, signals to be transmitted by the first bus interface via the multi-line bus are mapped in accordance with the mapping parameters in that the signals to be transmitted, which are in conformity with the first signal order scheme, are rearranged such that the resulting rearranged signals are in conformity with the second signal order scheme. The rearranged signals are asserted on the lines of the multi-line bus.

According to an exemplary embodiment of the present invention, the mapping parameters are received at the first bus interface in that signals of a signal sequence in time are subsequently detected. Each signal is detected at a different line of the multi-line bus. The signal sequence is driven by the second bus interface within a predefined period. It is determined at which bus lines each signal is detected. The second signal order scheme is determined in dependence of the signal sequence in time and the determined bus lines on which the signals have been detected.

According to an exemplary embodiment of the present invention, a mapping command is received from the second bus interface, which command prepares the first bus interface to receive the mapping parameters. The mapping command is selected such that the command can be detected by the first bus interface independent of whether signal mapping is yet configured or not.

According to an exemplary embodiment of the present invention, the second bus interface transmits the mapping parameter by subsequently driving signals on at least the part of lines of the multi-line bus in an order which corresponds to the second signal order scheme.

According to an aspect of one exemplary embodiment of this invention, a method of signal mapping is provided. Mapping parameters are transmitted from a first bus interface to a second bus interface via a multi-line bus, which couples the first interface and the second interface enabling communication between them. The mapping parameters allow for identifying which signals are carried on at least a part of lines of the multi-line bus at the same time. The second bus interface is configured to expect to receive signals in a second signal order scheme in relationship to the lines of the multi-line bus. The second interface is instructed by the mapping parameters to apply the mapping parameters to any signals on the multi-line bus. The signals are detected on the multi-line bus. The detected signals are in conformity with the first signal order scheme and the detected signals are mapped in accordance with the mapping parameters in that the detected signals are rearranged such that rearranged signals are obtained, which are in conformity with the second signal order scheme.

According to an exemplary embodiment of the present invention, the mapping parameters are transmitted in that a signal sequence in time is asserted signal by signal. Each signal of the signal sequence is asserted at a different line of the multi-line bus and the signal sequence is driven within a predefined period of time. Each signal is asserted at a line of the multi-line bus in accordance with the first signal order scheme. The second signal order scheme is determinable in dependence of the signal sequence in time and the bus lines on which the signals are asserted.

According to an exemplary embodiment of the present invention, A mapping command is transmitted for preparing the second bus interface to receive the mapping parameters. The mapping command is selected to be independent of whether signal mapping at the second bus interface is enabled or not.

According to an exemplary embodiment of the present invention, a new first signal order scheme is configured at the first bus interface. Signals to be transmitted by the first bus interface are mapped in that the signals to be transmitted, which are in conformity with the first signal order scheme are rearranged such that rearranged signals are obtained, which are in conformity with the new first signal order scheme. The rearranged signals are asserted at the multi-line bus.

According to an aspect of one exemplary embodiment of this invention, a module capable for signal mapping of signals received through a first bus interface coupled to a multi-line bus is provided. A control logic of the module is adapted to receive mapping parameters through the first bus interface. The mapping parameters allow for identifying which signals are transmitted on at least a part of lines of the multi-line bus. The first bus interface is arranged to expect to receive signals, which are in conformity with a first signal order scheme, which defines the order of the signals on the multi-line bus at the same time in relationship to the bus lines carrying the signals. A mapping logic of the module is adapted to detect signals received via the multi-line bus. The detected signals are in conformity with a second signal order scheme, which is used by a second bus interface from which the signals have been received. The mapping logic is further adapted to map the detected signals in accordance with the mapping parameters in that the detected signals are rearranged such that the resulting rearranged signals are in conformity with the first signal order scheme.

According to an exemplary embodiment of the present invention, the mapping logic is further adapted to map signals to be transmitted by the first bus interface via the multi-line bus in accordance with the mapping parameters in that the signals to be transmitted, which are in conformity with the first signal order scheme, are rearranged such that the resulting rearranged signals are in conformity the second signal order scheme. The mapping logic is further adapted to drive the rearranged signals on the lines of the multi-line bus.

According to an exemplary embodiment of the present invention, the mapping logic is further configured to receive the mapping parameters by subsequently detecting a signal sequence in time. Each signal of the signal sequence is detected at a different line of the multi-line bus and the signal sequence is driven within a predefined period. The mapping logic is further configured to determine at which bus lines each signal is detected and to determine the second signal order scheme in dependence of the signal sequence in time and the determined bus lines on which the signals have been detected.

According to an exemplary embodiment of the present invention, a trigger logic of the module is adapted to receive a mapping command, which instructs for preparing the first bus interface and the mapping logic to receive the mapping parameters, respectively. The mapping command is selected to be independent of whether signal mapping is enabled or not.

According to an exemplary embodiment of the present invention the second bus interface is configured to transmit the mapping parameter in that signals are subsequently driving on at least the part of lines of the multi-line bus in an order which corresponds to the second signal order scheme.

According to an aspect of one exemplary embodiment of this invention, a module of signal mapping capability having a first bus interface is provided. Control means of the module are adapted to receive mapping parameters through the first bus interface coupled to a multi-line bus. The mapping parameters allow to identification which signals are transmitted on at least a part of lines of the multi-line bus. The first bus interface is configured to expect that signals received via the multi-line bus are arranged in a first signal order scheme, defining the signal order of signal at the same time on the multi-line bus in relationship to the lines of the multi-line bus. Mapping means of the module are adapted to detect signals received via the multi-line bus from a second bus interface. The detected signals are in conformity with a second signal order scheme, which is used by the second bus interface. The mapping means are further adapted to map the detected signals in accordance with the mapping parameters in that the detected signals are rearranged such that the resulting rearranged signals obtained are in conformity with the first signal order scheme.

According to an aspect of one exemplary embodiment of this invention, module of signal mapping capability is provided, which has a first bus interface. A control logic of the module is adapted to transmit mapping parameters from the first bus interface to a second bus interface via a multi-line bus coupling the first and second interfaces, the mapping parameters identifying which signals are carried on at least a part of lines of the multi-line bus, the second bus interface expecting to receive signals in a second signal order scheme in relationship to the lines of the multi-line bus. The control logic is further adapted to instruct the second interface to apply the mapping parameters to any signals on the multi-line bus, wherein the signals on the multi-line bus being in conformity with the first signal order scheme, to map the signals in accordance with the mapping parameters by rearranging the detected signals resulting in rearranged signals being in conformity with the second signal order scheme.

According to an exemplary embodiment of the invention, the control logic is further adapted to transmit the mapping parameters by subsequently asserting a signal sequence in time. Each signal of the signal sequence is asserted at a different line of the multi-line bus. The signal sequence is driven within a predefined period of time. Each signal is asserted at a line of the multi-line bus in accordance with the first signal order scheme and the second signal order scheme is determinable in dependence of the signal sequence in time and the bus lines on which the signals are asserted.

According to an exemplary embodiment of the invention, the control logic is further adapted to transmit a mapping command, which instructs the second bus interface to prepare for receiving the mapping parameters. The mapping command is selected to be independent of whether signal mapping at the second bus interface is enabled or not.

According to an exemplary embodiment of the invention, the control logic is further adapted to configure a new first signal order scheme at the first bus interface. A mapping logic of the module is configured to map signals to be transmitted by the first bus interface. The signals to be transmitted, which are in conformity with the first signal order scheme, are rearrange such that rearranged signals are obtained, which are in conformity with the new first signal order scheme. The mapping logic is further adapted to assert the rearranged signals at the multi-line bus.

According to an aspect of one exemplary embodiment of this invention, module of signal mapping capability is provided, which has a first bus interface. The module comprises control means, which are adapted to transmit mapping parameters from the first bus interface to a second bus interface via a multi-line bus coupling the first and second interfaces. The mapping parameters allows for identifying which signals are carried on at least a part of lines of the multi-line bus. The second bus interface is configured to expect signals received thereat, which have a second signal order scheme. The second signal order scheme defines a relationship between the interface signals and the interface terminals, respectively, and the lines of the multi-line bus carrying the respective interface signals of the second bus interface. The control means of the module are further adapted to instruct the second interface to apply the mapping parameters to any signals on the multi-line bus. The signals on the multi-line bus, which are in conformity with the first signal order scheme, are further mapped by the control means in accordance with the mapping parameters in that signal detected on the multi-line bus are rearranged such that rearranged signals are obtained, which are in conformity with the second signal order scheme.

According to an exemplary aspect of the present invention, a system of signal mapping capability is provided. The system comprises a multi-line bus; a first component having a first bus interface coupled to the multi-line bus; and a second component having a second bus interface coupled to the multi-line bus. The first component further comprises a control logic, which is adapted to transmit mapping parameters from the first bus interface to the second bus interface via the multi-line bus. The mapping parameters allow for identifying which signals are carried on at least a part of lines of the multi-line bus. The first bus interface of the first component is further configured to transmit signal, which are in conformity with a first signal order scheme. The second component further comprises a control logic, which is adapted to receive the mapping parameters through the second bus interface. The second bus interface is configured to expect that signals received from the multi-line bus have a second signal order scheme in relation to the lines of the multi-line bus. A mapping logic of the second component is adapted to detect the signals transmitted by the first bus interface via the multi-line bus. The mapping logic of the second component is further adapted to map the detected signals in accordance with the mapping parameters. The mapping is obtained by rearranging the detected signals such that rearranged signals are obtained, which have the second signal order scheme.

BRIEF DESCRIPTION OF THE DRAWINGS

Various exemplary embodiments of this invention will be understood more completely when referring to the drawings accompanying the description, which illustrate various embodiments of the invention. The embodiments shown in the drawings are not intended to suggest any limitation as to the scope, use, or functionality of the present invention. In the drawings.

FIG. 8a illustrates a schematic block diagram showing external and internal signal order schemes and mapping schemes of host and slave components after initialization according to an embodiment of the present invention;

FIG. 8b illustrates a schematic block diagram showing external and internal signal order schemes and mapping schemes of host and slave components after configuration according to an embodiment of the present invention;

DETAILED DESCRIPTION

Figure 1:
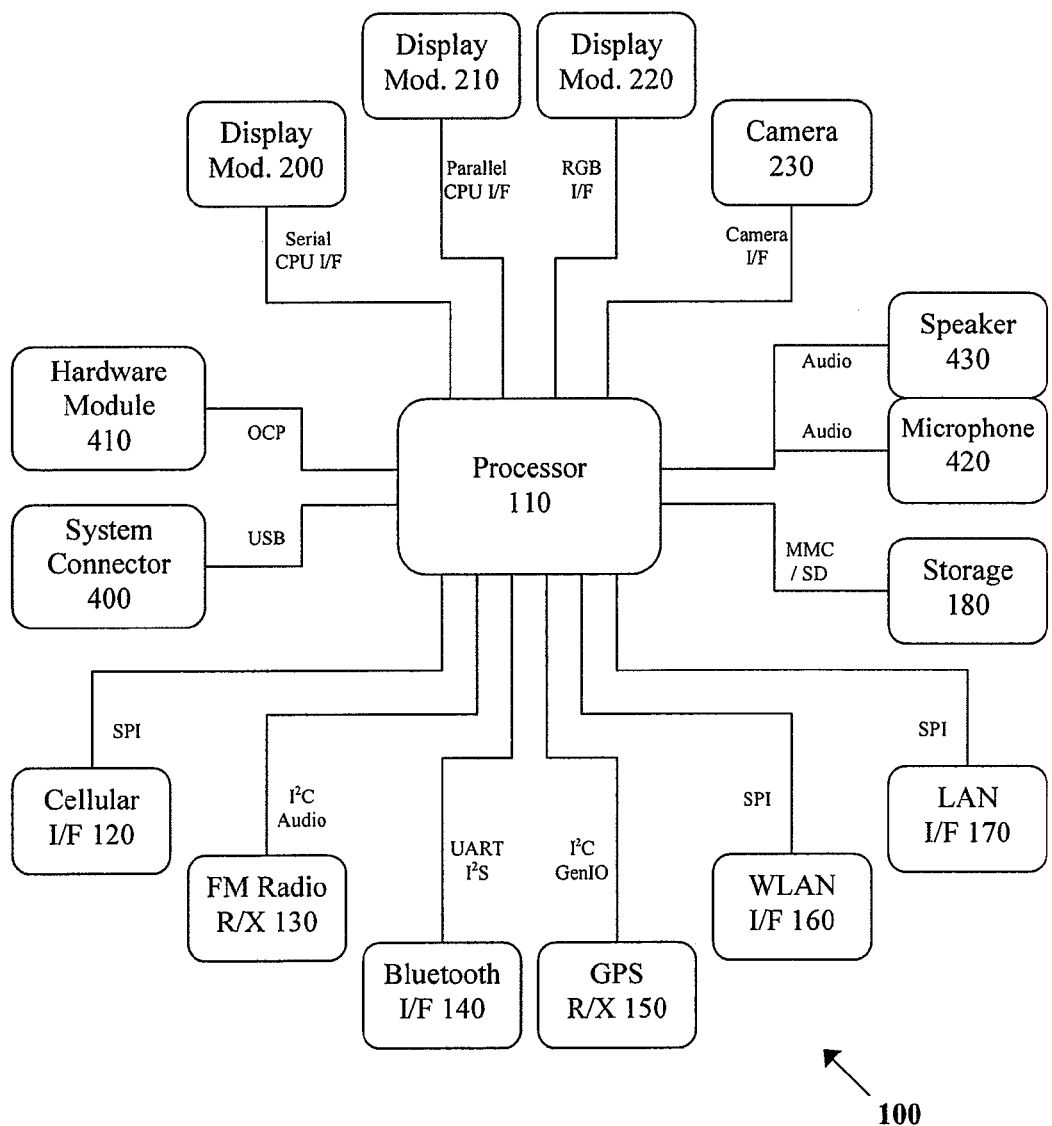
FIG. 1 illustrates a schematic block diagram of a processor-based electronic device according to an embodiment of the present invention.

The following exemplary embodiments are described in sufficient detail to enable those skilled in the art to practice the invention, and it is to be understood that the various embodiments may be combined, or that other embodiments may be utilized and that structural, logical and electrical changes may be made without departing from the spirit and scope of the present invention. It should be noted that references to "an", "one", or "various" embodiments in this document are not necessarily to the same embodiment, and such references contemplate more than one embodiment. Same or similar components have the same reference numeral.

FIG. 1 illustrates a schematic block illustration of components of an electronic device 100, which may in particular represent a portable electronic device such as a portable cellular communication enabled processing terminal including a cellular smart phone, a portable digital assistant (PDA), a portable computer including a notebook and the like. The example illustrated in FIG. 1 is a suitable electronic device environment in which the invention may be implemented, although as will become apparent from the description the device environment is only one example and is not intended to suggest any limitation as to the scope of use or functionality of the present invention. Neither should the electronic device 100 be interpreted as having any dependency or requirement relating to any one or combination of components illustrated in the exemplary electronic device 100. Rather any kind of processing device or processing terminal device is applicable with the present invention. This means that the present invention is neither limited to the illustrated electronic device 100 nor to any other specific kind of processing terminal or device.

Herein, the illustrated electronic device 100 is embodied as a wireless communication enabled processing terminal being capable for data processing and data communications. The electronic device 100 comprises at least one processor 110, which can be a central processing unit (CPU) or an application specific processor such as a mobile processing unit (MPU), or micro controller (μC). The device 100 may also comprise data and application storages (not shown), input/output user interface means, communication interface means, storages means 180 and further hardware modules 410. The input/output user interface means may typically include audio input (e.g. Microphone 420) and audio output (e.g. Speaker 430) means; keys, keypad and/or keyboard (not shown) with key input controller (not shown); one or more display modules 200, 210, and 220 each having a display controlled via a display driver; and image capture components such as a camera 230. The storage means 180 may include, for example, Multi-Media Card (MMC) or Secure Digital (SD) Card.

The communication interface means may comprise one or more wireless and/or wired communication interfaces and enable access to communication media, which typically embody computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), a low-power radio frequency (LPRF), infrared, and other wireless media. Combinations of any of the above should also be included within the scope of computer readable media. For instance, the (wired or wireless) communication interface may comprise one or more out of a group comprising a cellular communication interface (I/F) 120, a Bluetooth interface (I/F) 140, a wireless local area network (WLAN) interface (I/F) 160, a tunable FM radio receiver (R/X) 130, a Global Positioning System (GPS) receiver (R/X) 150, a local area network (LAN) interface (I/F) 170 or wide area network (WAN) interface, a Universal Serial Bus (USB) interface (e.g. via the system connector 400), a Firewire (IEEE 1394x standard) interface and any further standardized and/or proprietary interfaces (not shown). A WLAN interface 160 may for instance support any of the IEEE (Institute of Electrical and Electronics Engineers) 802.xx standards for wireless data communication including in particular WI-FI (IEEE 802.11x) standards, WiMax (IEEE 802.16x) standard and future developments such as IEEE 802.20; a Bluetooth interface 140 may support any of the Bluetooth versions 1.0 to 2.0+EDR (Enhanced Data Rate), IEEE 802.15.x and/or future standard 2.1 and 3.0; and a cellular interface 120 may support any of the $2^{nd}/2.5$ generation cellular standards including for instance GSM (global system for mobile communication) with GPRS (General Packet Radio Services) and/or EDGE (Enhanced Data rates for GSM Evolution) support; IS-95 (Interim Standard 95) or cdmaOne; IS-136 (Interim Standard 136); PDC (Personal Digital Cellular); and/or $3^{rd}$ generation standards including CDMA (Code Division Multiple Access) based standards such as CDMA-2000 1x, 3x, 1xEV-DO (1x Evolution-Data Optimized), or 1xEV-DV (1x Evolution-Data/Voice); W-CDMA (Wideband Code Division Multiple Access); TD-SCDMA (Time Division-Synchronous Code Division Multiple Access); FOMA (Freedom of Mobile Multimedia Access); UMTS (Universal Mobile Telecommunications System) and the like. Further communication standards may be supported by the electronic device such as Wireless USB according to ECMA-368 (European Computer Manufacturers Association) standard; Zigbee according to IEEE 802.15.4; Wibree and any other low power radio frequency (LPRF) communication standard.

The operation of the terminal device 100 is typically controlled by the processor (CPU/MPU) 110 with the help of an operating system or basic controlling application, which enables exercising control over functions, features, and functionalities of the electronic device 100 by offering their usage to the user of the electronic device 100. The function, features, and functionality of the electronic device 100 are enabled by the means of hardware and/or software components. Such hardware components, which will be exemplarily described below, are enabled for communication with the processor (CPU/MPU) 110 through one or more standardized and/or specific data communication connections and/or buses (serial or parallel). Software components are typically stored in the data and application storage, which may comprise any computer readably media. Computer readable media can be any available media that can be accessed by electronic device 100 and includes one or both volatile and nonvolatile media, removable and non-removable media. By way of example, and not limitation, computer readable media may comprise computer storage media implemented in any method or technology for storage of information such as computer readable instructions, data structures, or program modules. Computer storage media includes, but is not limited to, RAM (Random Access Memory), ROM (Read-Only Memory), EEPROM (Electronically Erasable Programmable Read-Only Memory), flash memory or other memory technology, CD (Compact Disc), DVD (Digital Versatile Disc) or other optical disk storage, magnetic cassettes, magnetic tape, magnetic disk storage or other magnetic storage devices, or any other medium which can be used to store the desired information and which can be accessed by electronic 100. Software components include a list of instructions to be executed by the processing unit (CPU/MPU) 110 in consequence of which a processing result may be (audibly and/or visibly) presented to the user and/or one or more other (hardware and/or software) components are controlled and/or instructed to operate.

The display and display controller (not shown in FIG. 1) are typically controlled by the processor (CPU/MPU) 110 and provided for displaying information to the user including such as a (graphical) user interface (UI) allowing the user to make use of and control the functions, features and functionality of the electronic device 100. The keypad and keypad controller (not shown in FIG. 1) are provided to enable the user inputting information. The information input via the keypad is conventionally supplied by the keypad controller to the processor (CPU/MPU) 110, which may be instructed and/or controlled in accordance with the input information. The audio input/output (I/O) means includes for instance a speaker 430 for reproducing an audio signal and a microphone 420 for recording an audio signal. The processing unit (CPU/MPU) 110 can control conversion of audio data to audio output signals and the conversion of audio input signals into audio data, where for instance the audio data have a suitable format for transmission and storing. The audio signal conversion between digital audio signals and analog audio signals is conventionally supported by digital-to-analog and analog-to-digital circuitry e.g. implemented on the basis of a digital signal processor (DSP, not shown) supporting the processor of the electronic device 100.

Components of electronic device 100 may include, but are not limited to, one or more communication buses that couples various device components to the processor 110. The buses may be any of several types of bus structures including memory buses, peripheral buses, and local buses using any of a variety of bus architectures. By way of example, and not limitation, typical bus architectures include general purpose buses such as Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), or PCI Express bus. Without limitation thereto, in the field of processing devices further interface architectures are used for coupling components including, but not being limited thereto, Inter-Integrated Circuit ($I^2C$), Integrated Interchip Sound ($I^2S$), Universal Asynchronous Receiver/Transmitter (UART), Open Core Protocol (OCP), Multimedia Card/Secure Data (MMC/SD) bus, USB (Universal Serial Bus), Serial Port Interface (SPI), Intel 80 parallel interface, serial CPU interface, parallel CPU interface, RGB interface, and camera interface (Camera I/F).

In principle, interface and bus architectures can be categorized into point-to-point connectivity and multipoint connectivity. Point-to-point connectivity means that two electronic components communicate via respective interfaces coupled via a bus. Typically, one of the components (i.e. the host) exercises control over the bus. Multipoint connectivity means that a shared common bus couples several components enabling communication over the common bus. The so-called Intel 80 processor bus is an exemplary shared bus for coupling several components to one processor and allowing the processor to access the components via the shared bus. The control over the shared bus may be exercised by the processor (i.e. the host) or with the help of arbitration logic such as an access controller. A shared bus having only two components coupled to each other via the bus may be designated as point-to-point bus architecture.

Further, different signaling modes distinguish interface and bus architectures. Typically single-ended signaling and differential signaling is used in the filed of interface and bus architectures. In single-ended signaling, a transmitting component (i.e. a transmitter logic) drives a single voltage on a signaling line, which is detected by a receiving component (receiver logic) and compared at the receiving component with a fixed reference voltage relative to a common ground shared by both the transmitting and receiving components.

Differential signaling uses a difference signal between two lines to signal information. The two lines are conventionally routed in parallel or twisted together. One line carries the signal and the other line carries the inverse of the signal so that the sum of the signal voltages on the two lines is constant. Differential signaling has a lower susceptibility to noise, which adds the same amount of interference voltage signal to the signaling on both lines (so-called common-mode noise). After determining the difference signal the noise common on both signal lines is cancelled.

In the following, the description will be focused on multi-line data communication interface and bus architecture. In particular, the description will be focused on interface and bus architecture for coupling display modules to processors. Interface and buses used for coupling processors and display modules typically comprises one or more control signals and signal lines as well as data signals and data signal lines. Interfaces and buses with several data signals and lines used for communicating a plurality of signals at the same time are commonly designated as parallel interfaces and buses, respectively. The skilled person will understand on the basis of the following description that it is not intended to suggest any limitation as to the scope of use or functionality of the invention which is illustratively explained on the basis of such interface and bus architecture.

Figure 2:
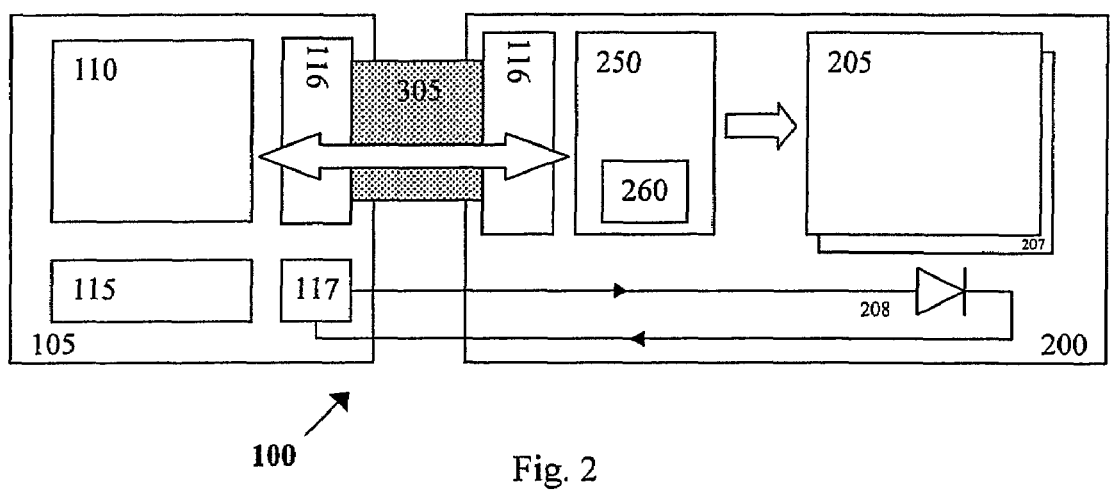
FIG. 2 schematically illustrates a simplified block diagram of the processor-based electronic device according to another embodiment of the present invention.

A simplified device architecture, which is not intended for limiting the invention, is shown in FIG. 2. In FIG. 2, a base printed circuit board (PCB) or printed wiring board (PWB) 105 carrying components of the electronic device 100 including inter alia data storage component 115 (for instance memory component), a processor 110 and a LED (light emitting device) controller 117 is electrically coupled via a flex foil 305 to a display module 200 including inter alia one or more LEDs 208 for emitting light into a light guide 207, a display driver 250 or display controller and a display panel 205 such as an liquid crystal panel (e.g. a liquid crystal display). The light guide 207 provides for back light of the display panel 205. FIG. 2 schematically illustrates a simplified information flow between the aforementioned components. Processor communicates image information to the display driver 250 of the display module 200 and signals control information to the LED controller 117. Both the processor 110 and the display driver 250 are provided with parallel display interface connectors 116, which are coupled through a bus 300 provided on the flex foil 305 being arranged for connecting to the display interface connectors 116. The display driver 250 receives the image information sent by the processor 110 via the bus 300 and drives the pixels of the display panel 205 accordingly such that an image in correspondence with the image information is displayed thereon. The communication between processor 110 and display driver 250 may not be limited to image information. The processor 110 may also communicate commands and control information to the display controller 250 or may request any information from the display driver 250. Such command and control information may be processed by a display panel parameter controller 260 of the display module 200.

The flex foil 305 according to an embodiment of the present invention is provided with several electrical conductors, which are arranged in parallel thereon. Each electrical conductor is arranged to electrically connect one terminal of the display interface connector 116 (either arranged at the base PCB/PCB 105 or arranged with the display module 200) to the respective terminal of the other display interface connector 116. The flex foil 305 may have respective connectors for being pluggable to the connectors 116. Such flex foils are typically used when the electric device is set up of several PCBs/PWBs each carrying different functional modules such as a processor module, one or more display module, communication modules and the like. Flexible foils being provided with electrical conductors for electric connection of the different modules allows for high degree of freedom in special arrangement of the modules to each other. However, it is not intended to limit the present invention to flex foils or any other specific media having conductors forming a (parallel, multiline) bus 300. Moreover, the present invention may be used in any layout and design of an electric device 100 including in particular a device design comprising only one PCB/PWB and device designs having several specific PCBs/PWBs.

A typical interface and bus architecture used for coupling processors to display drivers/controller and display modules is Serial CPU interface or Parallel CPU interface technology, which may be implemented on an Intel 80 parallel bus for coupling processors and to display modules. Another exemplary interface and bus architecture technology for coupling processors and display modules is the RGB interface technology. These interface technologies use parallel buses with multiple parallel lines for communicating command and image/video data between processors and display modules.

The parallel CPU interface provides different signals including a Write Signal (WRX) to indicate that information is sent from a host component (e.g. a processor) to a slave component (e.g. the display module); a Read Signal (RDX) to indicate that information is requested for reception by the host component; a Command/Data Signal (D/CX) to indicate whether information sent via data signals is a command or data; a Chip Select Signal (CSX) to select a specific slave component; a Reset Signal (RESX) to signal a reset (initialization command) to a slave device; and eight (8) or sixteen (16) data signals (D[7 . . . 0] or D[15 . . . 0]) to send or receive information. A bus to coupled the host component and at least one slave display component comprises one line for each of the aforementioned signals WRX, RDX, D/CX, CSX, RESX, and D[7 . . . 0] or D[15 . . . 0].

Similarly, the RGB interface provides different signals including a Pixel Clock (PCLK) providing a clock signal by the host component to the slave components, a Data Enable (DE) to indicate whether the information sent by the host is to be displayed, a Vertical Synchronization (VS) to indicate the start of a new image frame to be displayed, a Horizontal Synchronization (HS) to indicate the start of a new line of an image frame to be displayed, and twenty four (24) data signal (D[23 . . . 0]) to send or receive information. The twenty four (24) data signal (D[23 . . . 0]) may be composed of 8 data signals for carrying red image data, 8 data signals for carrying green image data and 8 data signals for carrying blue image data. A bus to coupled the host component and at least one slave display component comprises one line for each of the aforementioned signals PCLK, DE, VS, HS, and D[23 . . . 0]. The RGB interface is a parallel RGB interface comprising 28 signals in total.

A developer which has to design the layout of electronic device and in particular the printed wiring boards (PWBs) thereof carrying the different components faces the problem that multi-line buses coupling different electronic components of the electronic device are susceptible to external interference signals and crosstalk between the lines. In order to minimized crosstalk effects, the lines of multi-line buses are typically routed in parallel on printed wiring boards, flex foils or any other substrates. The developer faces also the problem that pin out arrangements of electronic chips differ. Hence, a crossing routing of lines can conventionally not be prevented. However, the layout of crossing lines requires multi layer printed wiring boards having several conductive layers and vias to provide electric connections between the conductive layers. Today, technology is available, which allows design of rigid multi-layer printed wiring boards having 10 or more conductive layers and blind/buried vias and flexible multi-layer boards (flex foils). However, the design of the routing of electrical connections on such multi-layer boards is time intensive and the production costs increase rapidly with each additionally required layer. Furthermore, problems of electrical magnetic design (EMD), impedance matching requirements, and electrical characteristics of the vias and layers may limit the operation capability of the electronic device, or may delay development cycles. Even worse, redesign of the wiring or even redesign of pin out arrangements of electronic components may have to be considered.

The developer of an electric device may also face the problem that one or more electronic components are obtained from different suppliers (manufactures), should be replaced with functional identical ones, or are discontinued by the suppliers. Although such alternative components may be equal in their functionality, the pin-out arrangements can differ. Again, a costly and time intensive redesign or one or more alternative designs may be required.

Figure 3A:
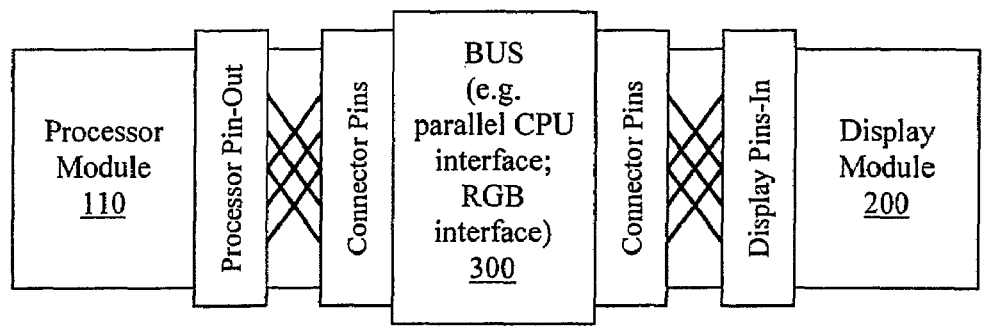
FIG. 3a schematically illustrates a typical chip package in different perspectives.
Figure 3B:
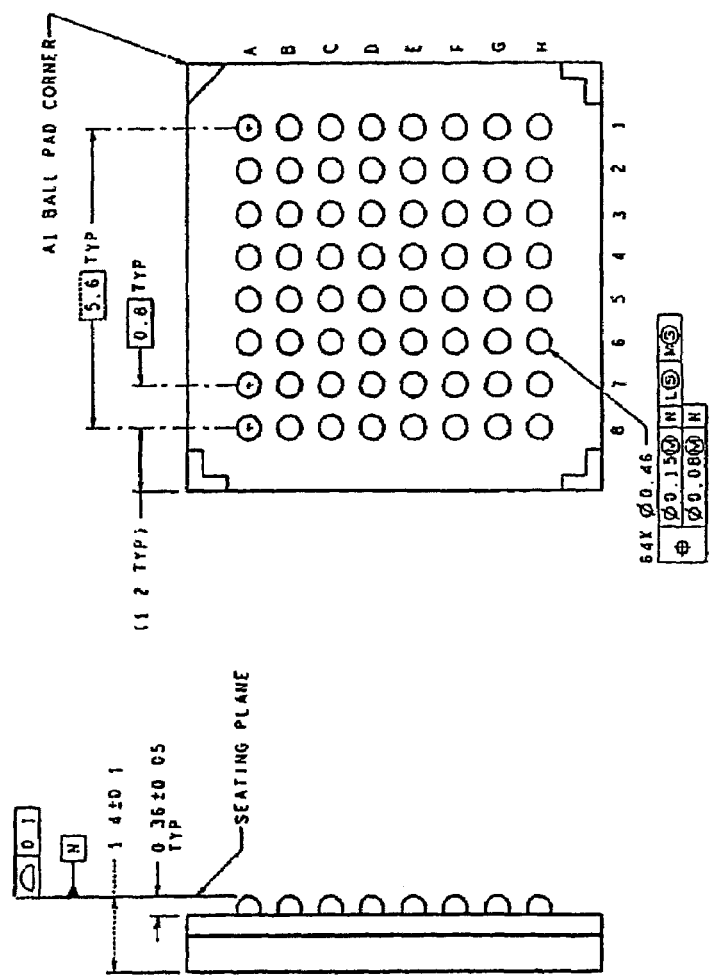
FIG. 3b illustrates a schematic block diagram of a conventional wiring layout of an electronic device according to an embodiment of the present invention.
Figure 3B:
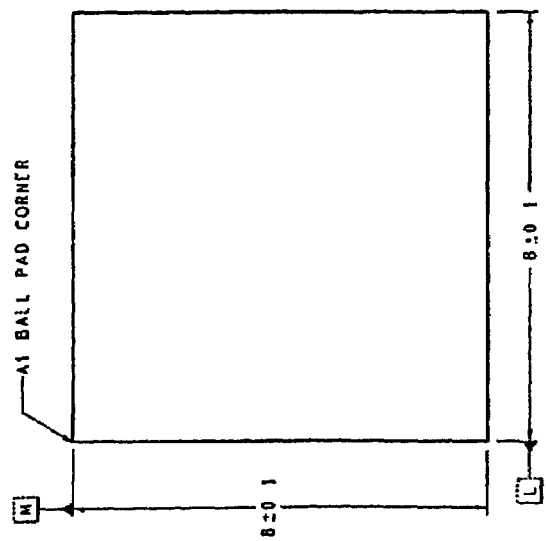

The current situation, with which the developer has to deal, is schematically illustrated in FIG. 3a with respect to a processor 110 and display module 200 coupled via a bus, which couples in particular one interface of the aforementioned serial CPU interface, parallel CPU interface, or RGB interface. The wiring layout with line crossing is schematically illustrated on processor side and display module side. The schematic illustration of FIG. 3a is not intended to limit the scope of the invention. For instance, the bus may be connected directly to terminals (such as pins or balls) of the processor 110 and/or display driver 250 of the display module 200 without the use of one or more connectors. The requirements of wiring layouts can be also understood when considering typical packages of chips such as the 64 pin/ball grid array package (PGA/BGA) shown in FIG. 3b. The internal wiring of signals to the connecting pins or balls is driven by layout aspects of the chip design and requirement of external wiring is only of minor importance to the chip designer. Hence, a chip of a first supplier may use the pins/balls A1 to A8, B1 to B8, and C1 to C8 for supplying the data signal D[23 . . . 0] of the RGB interface, whereas another supplier of a chip having the same functionality but having a different internal design may use any other pins/balls for supplying the same data signals. This situation applies to the processor 110 as well as the display module 200 with display driver 250 illustrated exemplarily in FIG. 2.

Figure 4A:
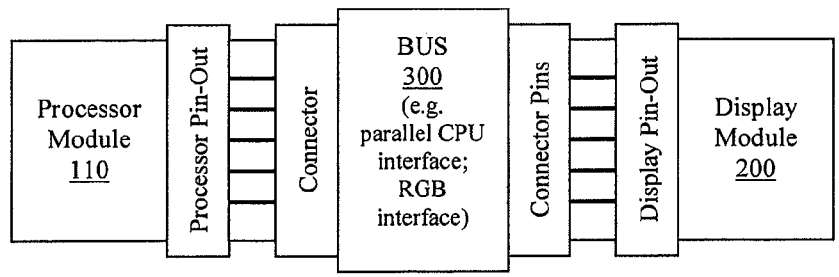
FIG. 4a schematically illustrates a block diagram of a wiring layout of an electronic device according to an embodiment of the present invention.
Figure 4B:
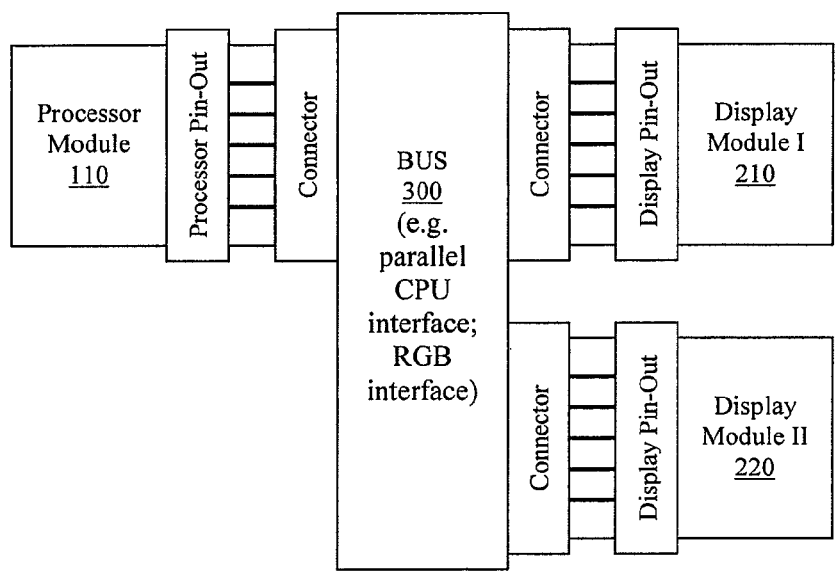
FIG. 4b schematically illustrates a block diagram of a wiring layout of an electronic device according to another embodiment of the present invention.

FIGS. 4a and 4b exemplarily illustrate a point-to-point bus architecture and a point-to-multipoint architecture with a common bus, respectively according to an exemplary embodiment of the present invention. The wiring layout with a desired minimum of line crossing is schematically illustrated on processor side and display module side in both example architectures. Wiring layout with at least a minimum of line crossing reduces significantly the complexity of the layout resulting in cost effective development and products.

Such an improved layout is obtained by a mapping unit which allows for configurable mapping and/or reconfigurable mapping of signals provided by an interface with respect to signal lines of a multi-line bus connected thereto. The mapping unit may be implemented as a unit being arranged between the multi-line bus and the multi-line interface of an electronic component, may be implemented with the electronic component having the multi-line interface or integrated into the multi-line interface forming a functional unit thereof. Such a mapping unit may be provided with at least one electronic component coupled to the bus 300 (e.g. with the host component such as the processor 110); with several electronic component (e.g. the slave components such as the display drivers 250 of the display modules 200, 210, and 220); with all components coupled through the bus 300.

Figure 5A:
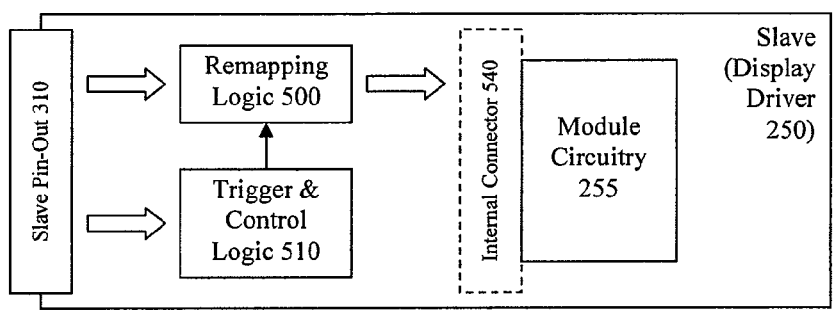
FIG. 5a schematically illustrates a block diagram of a slave component (e.g. display module) having a mapping unit according to an embodiment of the present invention.
Figure 5B:
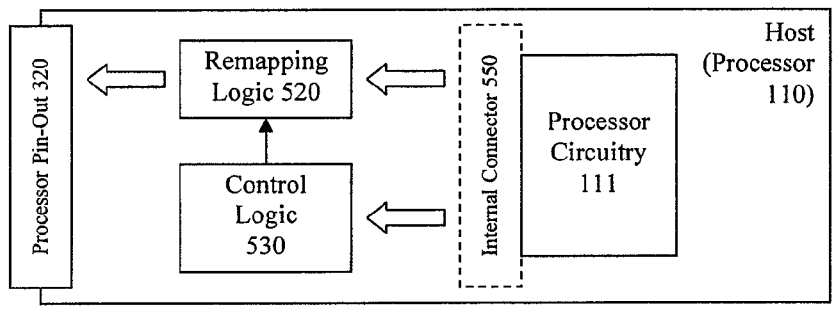
FIG. 5b schematically illustrates a block diagram of a host component (e.g. processor) having a mapping unit according to an embodiment of the present invention.

Different schematic embodiments of such mapping units are illustrated in FIGS. 5a and 5b. The implementation of the mapping units according to exemplary embodiments of the invention may differ in dependence of whether the mapping unit is to be provided with a host component (e.g. the processor 110), which may actively control the mapping of electronic components coupled through the bus 300 thereto, or the mapping unit is to be provided with one or more slave components, which adapt signal mappings of their interfaces to a signal order scheme defined by a host component instructing signal mapping schemes.

The mapping units may comprise inter alia a mapping logic 500, 520, which may be controlled by separate or integrated control logic 510, 530. The mapping logic 500, 520 is operable for mapping signals having a first signal order scheme into a second signal order scheme. The mapping of the signal order scheme may be understood when assuming that the mapping unit is provided with an external bus connector 310, 320, which couples the mapping unit to the multi-line bus 300, and an internal connector 540, 550, which couples to the internal circuitry of the slave component and host component, respectively. The internal circuitry 255, 111 has implemented the bus interface such as parallel bus interface or RGB interface according to embodiments of the present invention. Such interfaces, when coupled to a bus such as the Intel 80 parallel bus, have a predefined order of the signal terminals, which in turn define which interface signal is carried on which bus line. Although the types and numbers of interface signals are defined, the order of the interface signals at an interface connector having several signal terminals may vary. Hence, the mapping logic 500, 520 may be understood as a matrix switch, which switches signals at a terminal of the bus connector at a first position to a terminal of the internal connector at a second position, which is different from the first position. The relationship between the different positions is controlled by the means of the control logic 510, 530. Moreover, it should be understood that an internal connector 540, 550 may not be present; the mapping logic may be coupled to an internal bus of the slave or host component.

The mapping logic 500, 520 and/or the control logic 510, 530 may be implemented as hardware component and/or as software code sections, which when performed have the aforementioned mapping and/or controlling functionality. A trigger logic 510 may be additionally provided, which upon detection of a mapping command configures the control logic and mapping logic to operate in accordance with mapping parameters, which allow for configuring mapping schemes. The mapping parameters may enable the trigger and control logic 510 to be informed about the signal order scheme of a host component and the mapping scheme is established on the basis of the signal order scheme from the mapping parameters and the internal signal order scheme known to the trigger and control logic 510. The functionality and operation of the mapping units according to exemplary embodiments of the invention will become more comprehensible when referring to the flowing description relating to operations of the mapping units with respect to flow diagrams shown in FIGS. 6, 7, 10a and 10b.

Figure 6:
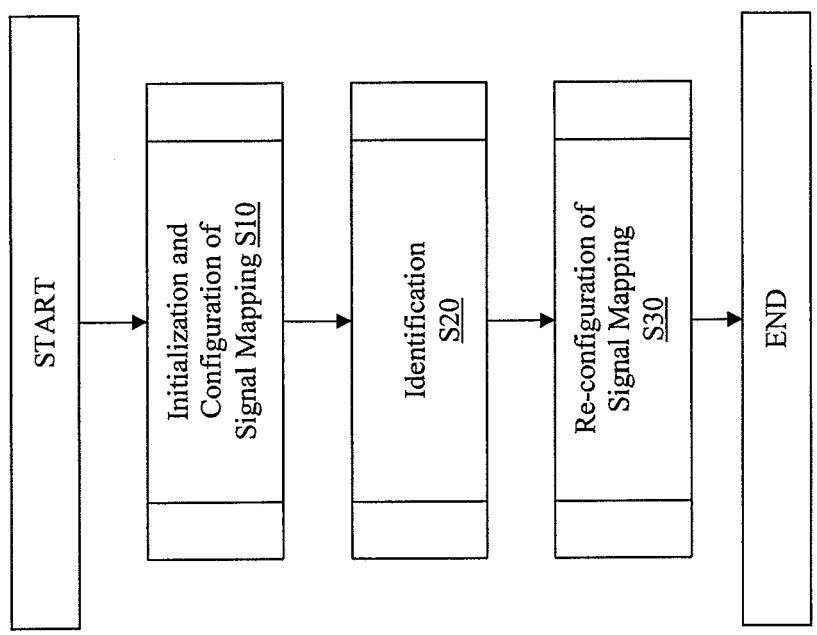
FIG. 6 illustrates a schematic overall flow diagram of operations performed at the electronic device according to an embodiment of the present invention.

FIG. 6 shows an overall flow diagram of the basic operations of a mapping unit according to an exemplary embodiment of the present invention. Although the basic operations are illustrated as subsequent operations, it should be understood that the flow diagram neither should be interpreted as having any dependency or requirement relating to any one or combination of operations illustrated in the exemplary flow diagram of FIG. 6. Operation S10 allows for enabling initialization and configuring a first signal mapping. The operations S20 and S30 may be performed, when a common bus is used to couple several components and/or re-configuration of the signal mapping is intended to be performed.

Figure 7:
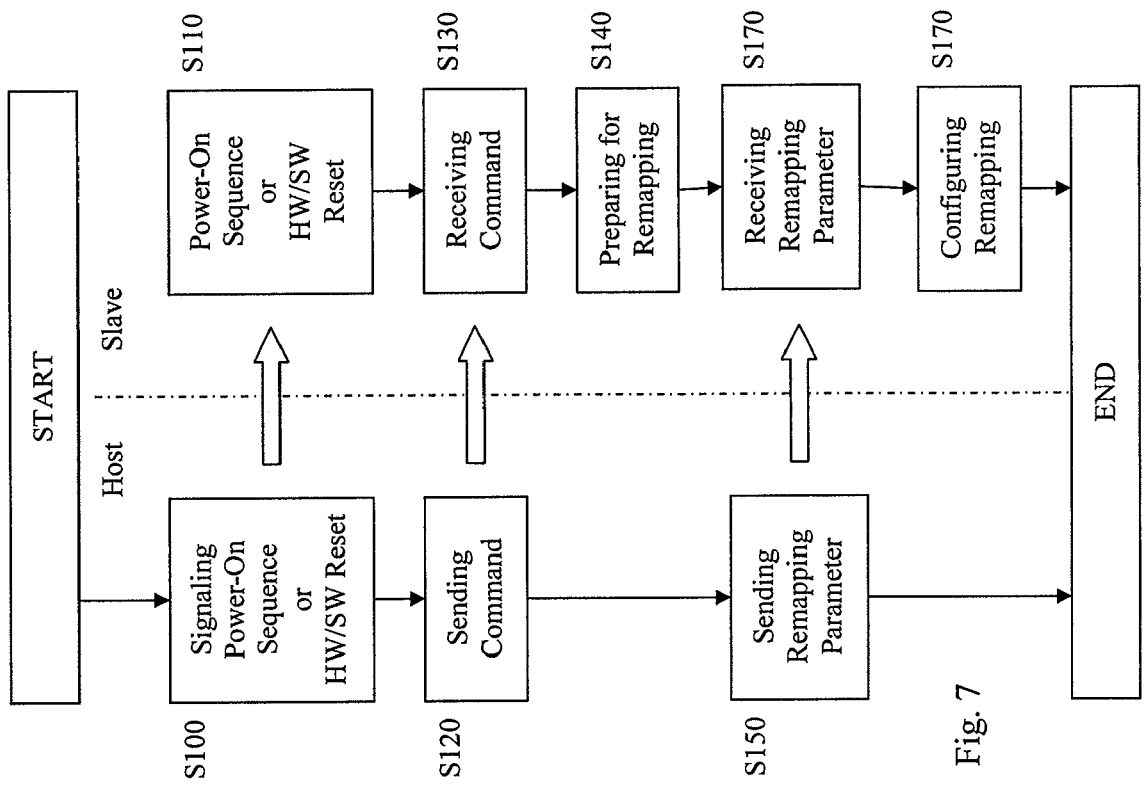
FIG. 7 illustrates a schematic flow diagram of operations for configuring signal order mapping performed at the electronic device according to an embodiment of the present invention.

In FIG. 7, a flow diagram relating to initialization and signal mapping operation S10 according to an exemplary embodiment of the present invention is illustrated in more detail. The initialization and signal mapping operations are performed to enable communication between the participating components coupled through a multi-line bus, i.e. to bring the components into interoperation. At least a host component and a slave component may participate in the operation. The host component is suggested to signalize an initialization and to instruct a signal mapping of the interface signals in relation to the lines of the bus coupling the components. In operation S100, an initialization signalization may for instance be performed in conjunction with a power-on sequence, a software or hardware reset. The initialization is signaled by the host component to the slave component, which receives the initialization signalization in an operation S110. Upon initialization signalization, the slave initializes and prepares for receiving further commands and data from the host component. In operation S120, the host component sends a mapping command to the slave components, which receives the command in operation S130. The mapping command indicates to the slave component that the host component requests for signal mapping of the slave bus interface. Thereafter, the slave component prepares in operation S140 for signal mapping. In operation S150, the host component signalizes the mapping parameters to the slave components, which are received thereat in operation S160. Upon reception of the mapping parameters, the slave component configures the signal mapping of the bus interface in accordance with the mapping parameters.

The operational sequence according to an exemplary embodiment of the invention describes above with reference to FIG. 7 will be further described in the following which reference to FIGS. 8a and 8b, which schematically illustrate a host component and a slave component each being provided with a parallel bus interface for data communication between the host component and slave component via the multi-line bus 300. With reference to the exemplary architecture shown in FIG. 4a, the host component may be the processor 110 and the slave component may be a display driver 250 of the display module 200 each being equipped with an interface such as the parallel CPU interface for image data transmission between the processor 110 and the display module 200. The bus is for instance via an Intel 80 parallel bus which may have eight or sixteen data lines. The display driver 250 of the display module 200 should be understood as having provided a mapping unit for mapping data signals received via the data signal lines 1 to 8 of the bus 300.

FIG. 8a schematically illustrates the state of signal mapping after initialization (S100, S110) but before configuring of signal mapping (S170) according to an embodiment of the present invention. The control signals RESX, CSX, D/CX, RDX, and WRX of the interfaces of the components (processor 110 and display driver 250 of the display module 200) are connected to each other via respective control signal bus lines. Herein, these control signals are not subjected to the signal mapping. Further, the data signals of the interfaces are connected in an arbitrary manner with each other via the data signal lines 1 to 8 of the bus 300. This means that any data signal (or data signal pin or data signal terminal) of the host interface is connected to any data signal (or data signal pin or data signal terminal) of the slave interface. For example, the bus line 1 is herein connected host interface terminal T1 being associated with data signal D[4] of the host interface (the interface of the host component/processor 110) and the bus line 1 is also connected to slave interface terminal T1 being associated with data signal D[1] of the slave interface (the interface of the slave component/display driver 250 of the display module 200). Host interface terminal T2 being associated with data signal D[6] of the host interface is connected via bus line 2 to slave interface terminal T2 being associated with data signal D[0] of the slave interface, host interface terminal T3 being associated with data signal D[1] of the host interface is connected via bus line 3 to slave interface terminal T3 being associated with data signal D[7] of the slave interface, and so on up to host terminal T8 being associated with data signal D[3] of the host interface connected via bus line 8 to slave interface terminal T8 being associated with data signal D[5] of the slave interface. Hence, such data signal wiring at the slave interface would not allow for data communication between the host and slave components. Data signals received have a signal order or signal order scheme, which does not match the required and expected signal order and signal order scheme at the slave interface, respectively.

The term signal order or signal order scheme should be understood as an order of interface signals at an interface on bus side. Conventionally, signal terminals of interfaces have a predefined (or standardized) order with respect to the interface terminal or bus lines connected thereto. In particular, interfaces, which are provided for being coupled to multi-line, multi-component buses require a predefined signal order or signal order scheme to ensure that the interface terminals of the bus interfaces coupled to the multi-line, multi-component bus have a matching signal order or signal order scheme such that the different interface terminals of the respective component interfaces couple to respective bus lines. Different signal orders or signal order schemes at different component interfaces conventionally renders such a multi-component bus coupling the components inoperable.

The interface of the slave component has an "internal" signal order scheme D'[7 . . . 0]. Configuration of the signal mapping provided on side of the slave interface is arranged for mapping the data signals on the data signal lines of the bus (i.e. on bus side), which signal order (scheme) D[7 . . . 0] matches the signal order (scheme) of the host interface, and the "internal" slave signal order D'[7 . . . 0] differing from that on the bus side and the "external" signal order (scheme) of the host interface, respectively. Therefore, a signal order mapping is established, which maps or translates between the host signal order D[7 . . . 0] and the original (internal) slave signal order D'[7 . . . 0], which is expected by the slave interface when signal order mapping is not enabled. The mapping parameters received from the host component enables the mapping unit provided with the slave component to rearrange any data signals at the data signal lines having host interface signal order scheme on bus side of the slave interface to rearranged data signals having original (internal) slave signal order, which are processable by the slave component.

FIG. 8b schematically illustrates the state of signal mapping after configuring of the mapping (S170) according to an embodiment of the present invention. The mapping parameters, which have been received from the host component allows for identifying, which data signal is communicated to which bus line at bus side of the host interface. This means that the mapping unit provided with the slave component identifies from the mapping parameters that line 1 carries data signal D[4] of the host interface, line 2 carries data signal D[6] of the host interface, line 3 carries data signal D[1] of the host interface and so on up to line 8 carrying data signal D[3] of the host interface. Hence, the host signal order in relation to the bus lines (as well as host interface terminals) is known at the mapping unit provided with the slave component. The mapping logic 500 of the mapping unit is configured on the basis of the mapping parameters to map any signal on the multi-line bus from host signal order to slave signal order upon data signal reception and from slave signal order to host signal order upon data signal transmission.

Originally, the original slave order scheme of the slave interface can be obtained from the association between the interface terminals T1 to T8 and the interface signals, which is herein D'[1], D'[0], D'[7], D'[3], D'[2], D'[6], D'[4], and D'[5], when starting with interface terminal T1. This original signal order scheme is also designated as internal signal order scheme. After configuration of the signal mapping at the slave interface, the association between slave interface terminal and slave interface signals corresponds to that of the host interface of the host component. This signal order scheme is also designated as external signal order scheme.

Figure 9A:
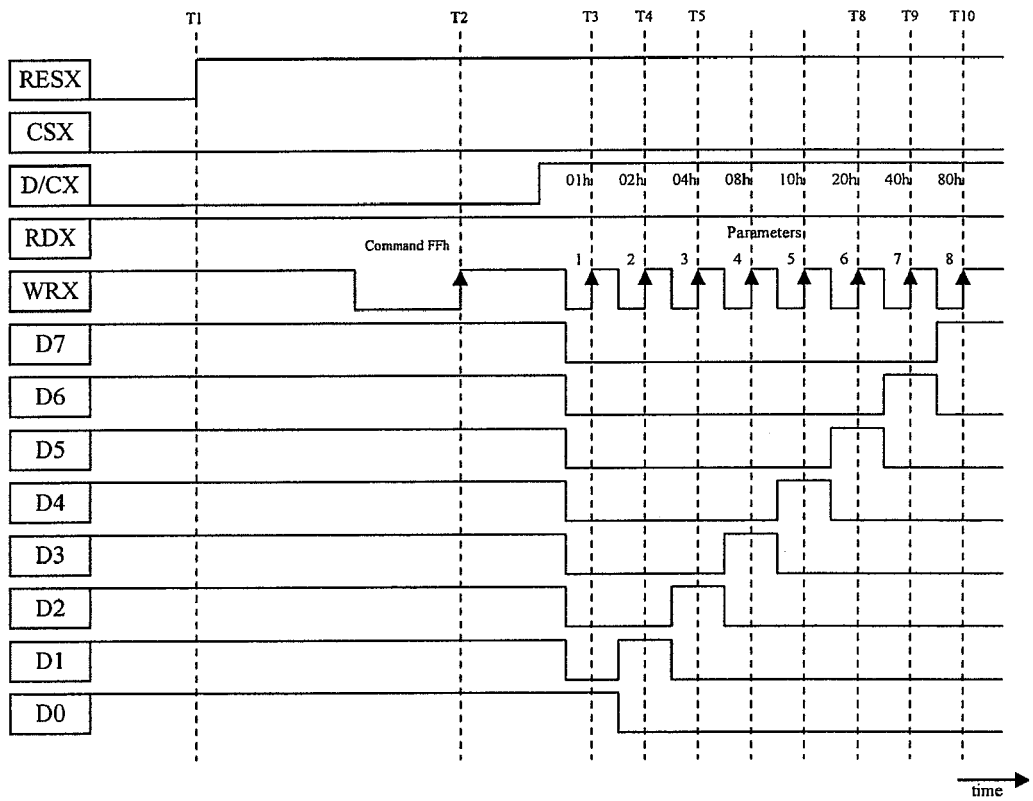
FIG. 9a illustrates a schematic signaling diagram showing control and data signals external asserted on the bus lines for initialization and configuration of signal mapping according to an embodiment of the present invention.
Figure 9B:
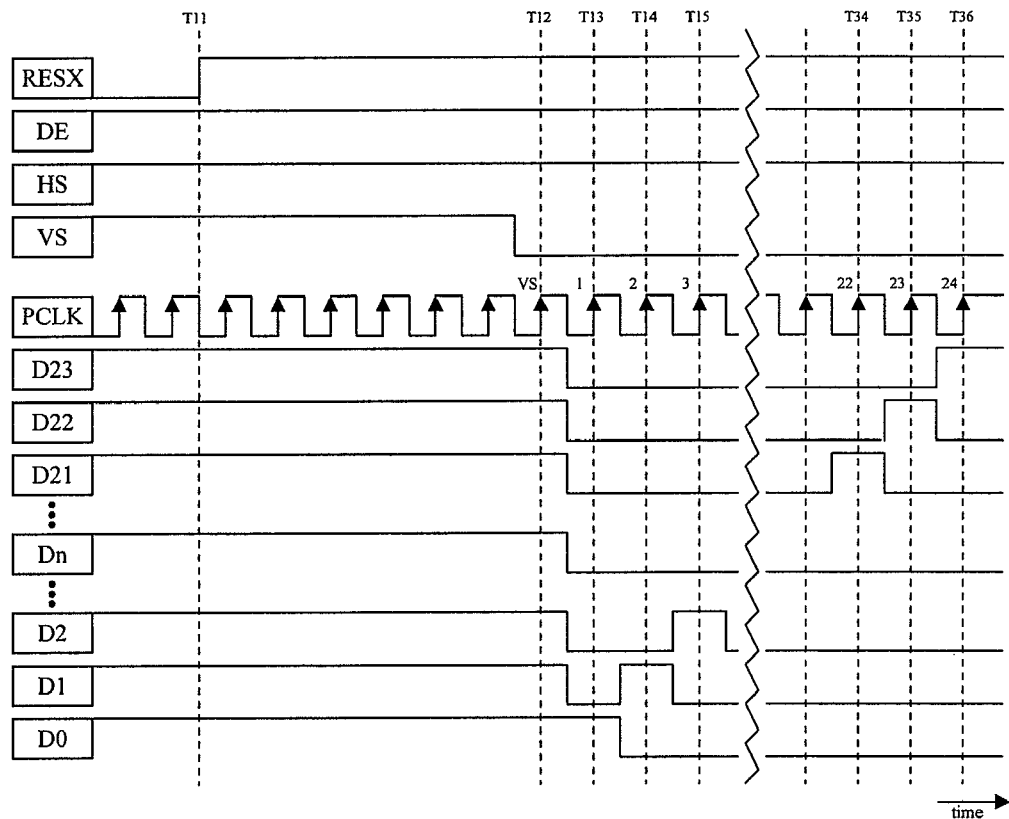
FIG. 9b illustrates a schematic signaling diagram showing control and data signals external asserted on the bus lines for initialization and configuration of signal mapping according to another embodiment of the present invention.

FIGS. 9a and 9b schematically illustrates signal sequences comprising inter alia mapping command and mapping parameter transmissions with respect to exemplary multi-line busses according to embodiments of the present invention.

In detail, FIG. 9a schematically illustrates a signal sequence on an Intel 80 parallel bus for coupling a parallel CPU interface of the host component and the slave component. In the following is should be assumed that WRX signal, RDX signal, CSX signal and RESX signal are active low, i.e. the host component drives a low signal level at its respective signal terminals and the bus lines coupled thereto to transmit a respective signal; otherwise the host component drives a high signal. Further, a low signal level at the D/CX signal terminal and the respective bus line indicates that a command is transmitted and a high signal level indicates that data is transmitted. Commands and data are driven on the data signal terminals D[7 . . . 0] as well as the bus lines 1 to 8 carrying the data signals D[7 . . . 0]. The host component asserts command and data at falling edges of the WRX signal, respectively, and the interface of the slave component detects the asserted command and data at rising edges of the WRX signal, respectively. In case of an interface with 8 parallel data signals 256 commands can be coded and in case of an interface with 16 parallel data signals 65536 commands can be coded. Moreover, the data signals D[0 . . . 7] should be assumed to be active high.

First, a reset signal (up to T1) is driven by the host component at the RESX signal and on the RESX signal bus line, respectively, to indicate a power-on sequence or a (hardware or software) reset to the slave component. After power-on or reset of the slave component, the mapping command is driven on the WRX signal bus line and the data signal bus lines D[0 ... 7] (cf. T2). The command is asserted on the data signal lines D[0 ... 7] at the falling edge of the WRX signal at T2, i.e. when the WRX signal level drops from high to low. At this moment, the signal mapping at the slave component is not yet configured. Hence, a command coded on the data signal lines D[0 ... 7] may be misinterpreted by the slave component due to a "false" signal mapping at the slave interface on the bus side. However, two commands, namely 00h and FFh ("h" is indicative to hexadecimal number) may be used even if the signal mapping is not yet configured. In the first case 00h, all data signal lines 1 to 8 of the bus carry signals having the same signal level. A mapping command coding 00h may be signalized by the host component driving all data signals at low signal level (corresponding to all signals indicating logical 0) whereas a mapping command FFh may be signalized by the host component driving all data signals at high signal level (corresponding to all signals indicating logical 1). Herein, the exemplary command FFh is suggested as mapping command. This means that the all data signals have high level at T2, where (at the rising edge of the WRX signal) the slave component detects the data signals carried on the data signals lines 1 to 8. Subsequently, the mapping parameters are signalized by the host component to the slave component via the data signal lines 1 to 8.

The mapping parameter transmission is established by transmission of a signal sequence comprising individual signals, which are subsequently driven by the host component on the respective host interface data signals D[7 ... 0] and data signal bus lines 1 to 8, respectively. Only one interface data signal D[7 ... 0] may be asserted by the host component at the same time such that only one interface data signal is driven on the respective data signal line at the same time. The signal sequence, in which the data signals are subsequently asserted by the host component on the respective bus line, may be predefined. The presence of an asserted data signal is indicated by a signal on the interface WRX control signal and WRX control signal bus line, respectively. As described above, each data signal is asserted by the host component at a falling edge of the WRX control signal, whereas each asserted data signal is detected by the slave component at rising edge of the WRX control signal. The WRX control signal is driven in conjunction with data signal assertion operations of the host component as well as controls detecting operations of the slave component of the data signals asserted by the host component. The signal sequence hence comprises a number of signals, which is equal to the number of interface data signals provided by the bus interfaces and data signal bus lines provided by the bus coupling the interfaces, respectively. Herein, the parallel bus (e.g. the Intel 80 parallel bus) comprises eight (8) data signal bus lines and the signal sequence for indicating which bus line carries which host interface data signal comprises correspondingly eight (8) individual signals (cf. T3 to T10). When assuming that the 8 parallel data signals are use to code a byte, the least significant bit (LSB) may be assigned to the data signal D[0] and the most significant bit (MSB) may be assigned to the data signal D[7], the signal sequence may comprise the data sequence 01h (=$2^0$), 02h (=$2^1$), 04h (=$2^2$), 08h (=$2^3$), 10h (=$2^4$), 20h (=$2^5$), 40h (=$2^6$), and 80h (=$2^7$), which correspond to data signal D[7 ... 0] having the bit representations (00000001), (00000010), (00000100), (00001000), (00010000), (00100000), (01000000), and (10000000). Hence, the mapping parameters are transmitted from the host component to the slave component in that a signal sequence is formed, which starts with asserting a first active signal on the bus line, which carries the least significant bit (i.e. data signal D[0]), continues with asserting a next active signal on the next bus line and ends with asserting an active signal on the bus line, which carries the most significant bit (i.e. data signal D[7]).

During transmission of the mapping parameters, the D/CX data signal is driven by the host interface of the host component at high level to indicate to the slave component that data is sent. During transmission of the mapping command, the D/CX data signal is driven by the host interface at low level to indicate to the slave component that a command is sent.

FIG. 9b illustrates a further signal sequence on a parallel bus for coupling the host component and the slave component through RGB interfaces. In the following, it should be assumed that RESX signal, HS signal and VS signal are active low. Further, a high signal level at the DE signal terminal and the respective bus line indicates that image data to be displayed is transmitted and a high signal level indicates that other data being not intended for display is transmitted. A clock signal is driven on the PCLK control signal. Commands and data are driven on the data signal terminals D[23 ... 0] and the bus lines carrying the data signals D[23 ... 0], respectively. The slave component detects data and control signal of the RGB interface asserted on respective bus lines at rising edges of the PCLK clock signal.

First, a reset signal (up to T11) is driven by the host component on the RESX signal bus line to indicate power-on or (hardware or software) reset to the slave component. After power-on or reset of the slave component, the mapping command is driven on the VS signal bus line in that the host drives an active low VS signal thereon (cf. T12). Alternatively, the HS signal or the DE signal may be used in further exemplary embodiments of the invention. Then, the mapping parameters are driven on the bus lines carrying the data signals D[23 ... 0]. The mapping parameters comprise a signal sequence of individual signals, which are subsequently driven by the host component at the respective interface data signals and on the respective data signal bus lines, respectively. Only one data signal may be asserted by the host component at the same time such that only one data signal is driven on the respective data signal line at the same time. The signal sequence, in which the data signals are subsequently asserted, may be predefined. Each signal of the signal sequence may asserted by the host component at falling edge and detected by the slave component at next rising edge of the PCLK signal carried on the PCLK bus line. The PCLK signal is used to trigger the assertion operation of the host component as well as the detecting operation of the slave component. The signal sequence comprises a number of signals, which is equal to the number of interface data signal and data signal bus lines, respectively. Herein, the parallel bus comprises twenty four (24) data signal bus lines and the signal sequence for indicating which bus line carries which interface data signal comprises correspondingly twenty four (24) individual signals (cf. T13 to T36). When assuming that the 24 parallel data signals are use to code a word having twenty four bits, the least significant bit is assigned to the data signal D[0]/data signal line D[0] and the most significant bit is assigned to the data signal D[23]/data signal line D[23], the mapping signal sequence may comprise the data sequence $2^0, 2^1, \ldots, 2^i, \ldots,$ and $2^{23}$ (i=0 ... 23; i∈N).

Analogously, the mapping parameters are transmitted from the host component to the slave component in that a signal sequence is formed, which starts with asserting a first active signal on the bus line, which carries the least significant bit, continues with asserting a next active signal on the next bus line and ends with asserting an active signal an the bus line, which carries the most significant bit.

The example illustrated in FIGS. 9a and 9b represent suitable signal sequences on the basis of which the invention may be implemented, although as it is apparent from the description the signal sequences are only examples and are not intended to suggest any limitation as to the scope of the present invention. Neither should the signal sequences be interpreted as having any dependency or requirement relating to any one or combination of operations illustrated with respect to the embodiments of the exemplary electronic device 100.

Referring now back to the flow diagram illustrated in FIG. 6, the identification operation S20 and the reconfiguration operation S30 will be described in more detail with reference to the flow diagrams illustrated in FIGS. 10a and 10b.

Figure 10A:
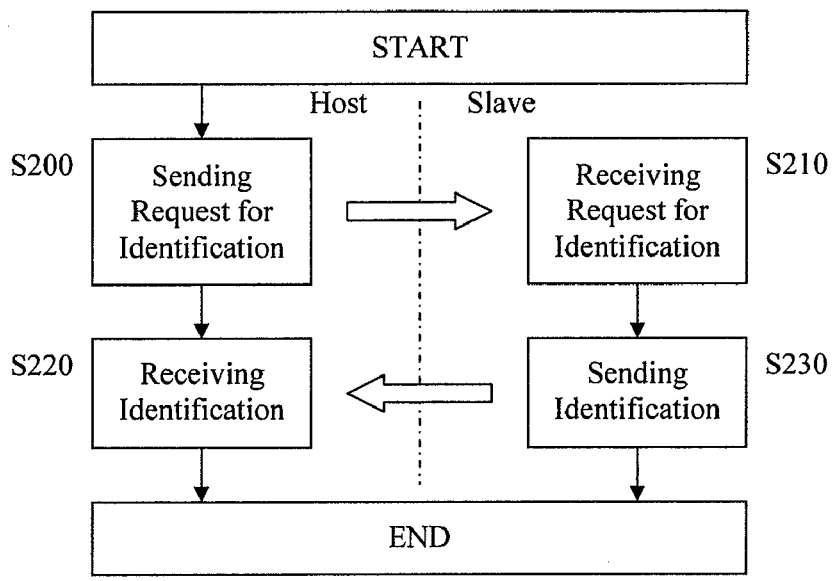
FIG. 10a illustrates a schematic flow diagram of operations for identification performed at the electronic device according to an embodiment of the present invention.

FIG. 10a schematically illustrates the identification operation according to an exemplary embodiment of the invention. Such an identification operation may be useful when performing mapping operations with one or more slave components coupled to the host component via a common bus. The host components sends in an operation S200 a request command to slave component, which instructs the requested slave component to respond an identifier on the basis of which the host component can identify the slave component coupled via the bus thereto. In particular identifiers which are responded by slave components coupled to a common bus should differ from each other or identifier of the slave component may relate to series identifier, type identifier, revision identifier, supplier identifier or part identifier. The identifier may be also any combination of the any one or more of the aforementioned identifiers. The slave component receives in an operation S210, the request command and sends back a response including the requested identifier in an operation S220. Then, the host receives in an operation S230 the response of the slave component which has been requested for identifying. The identifier comprises by such a response may be used later on by the host component to specifically address a slave component by the means of the identifier. Moreover, as will be described below in more detail, the identifier of a slave component may enable the host component to instruct for an individual (type, series, revision, supplier and/or part specific) mapping/signal order scheme of the slave component, which scheme is dependent on the identifier of the slave component.

Figure 10B:
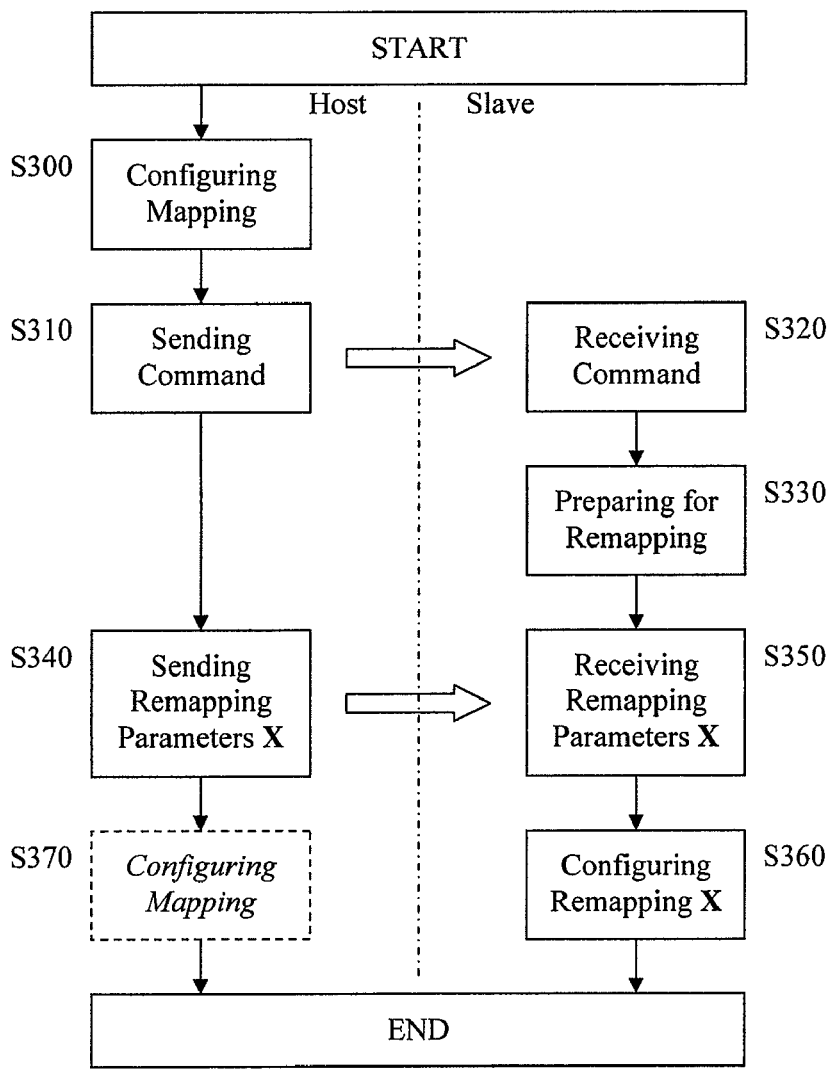
FIG. 10b illustrates a schematic flow diagram of operations for re-configuring signal order mapping performed at the electronic device according to an embodiment of the present invention.

FIG. 10b schematically illustrates the re-configuration of signal mapping according to an exemplary embodiment of the invention. Such a re-configuration of the signal mapping may be performed when the host component is also capable for mapping at least a part of the interface signals of the host interface on bus side. Similar to the slave component and slave interface described above, the host interface has an original ("internal") signal order D[7 . . . 0] and a configurable ("external") signal order D[7 . . . 0] on bus side. In principle, the mapping re-configuration operation on side of the slave component substantially corresponds to the mapping configuring operation as described above with reference to the flow diagram illustrated in FIG. 7 according to an embodiment of the present invention. The mapping re-configuration on side of the slave component may be performed by sending a mapping command from the host component to the slave component in an operation S310, which slave component receives the mapping command in operation S320 and prepares for re-configuring the mapping in an operation S330. Then, the host component sends the mapping parameters for re-configuration (herein mapping parameters X) to the slave component in an operation S340 and the mapping parameters for re-configuration are received at the slave component in operation S350, which re-configures the mapping of the bus lines and interface signals in accordance with the received mapping parameters, respectively.

The re-mapping operation according to an exemplary embodiment of the invention shown in FIG. 10b illustrates further two different cases: in the first case the mapping operation on side of the host component is performed previous to instructing re-configuration on side of the slave component and in the second case the mapping operation on side of the host component is performed subsequently to instructing re-configuration on side of the slave component.

The signal mapping on side of the host component may be performed by the means of a mapping unit such as embodied in FIG. 5b or the signal mapping may be performed by means of the host components. A mapping logic 520 receives the signals to be communicated by the host interface coupled to the multi-line bus 300. An internal connector 550 may couple the electric circuitry of the host component to the mapping logic 520. Control logic 530 may be further provided which controls the operation of the mapping logic; i.e. the control logic 530 configures the mapping logic in accordance with mapping rules enabling the translation between the signal order (scheme) on internal interface side and interface bus side.

Further, the mapping on side of the host component may be implemented on the basis of software (SW) mapping code section carried out on the host component (e.g. processor 110). The SW mapping code section may ensure that the signals at the component interface have another signal order scheme, in p particular different from an original signal order scheme. For instance, reference back should be given to FIG. 5a, which schematically illustrates a host processor 110 coupled through e.g. the parallel CPU interface bus 300 (having eight parallel data signal lines) to the slave display module 200 and in particular the slave display driver 250 of the display module 200, respectively. The display module 200 may integrate a frame buffer (not shown) and the configuration of the mapping is applicable to the signal order scheme of the data signal terminals of the parallel CPU interfaces of the host processor 110 and the slave display module 200. The host processor 110 communicates image data to the frame buffer of the display module 200. Software signal mapping code sections (corresponding to the mapping logic 520) being controlled by signal mapping algorithm code sections (corresponding to the control logic 530) may enable a mapping of bits at different bit position within each byte (8 bits), which is communicated via the parallel 8-bit data bus 300 at assertion of the WRX signal, resulting in mapped bytes each comprising bits at positions in conformity with the signal order scheme intended for being used for communication on the parallel bus 300.

The operational sequence according to an exemplary embodiment of the invention described above with reference to FIG. 10b will be further described in the following which reference to FIGS. 11a and 11b, which schematically illustrate a host component and a slave component each being provided with a parallel communication interface for data communication between the host component and slave component. The embodiment shown in FIGS. 11a and 11b should be understood as continuation of the embodiment shown in FIGS. 8a and 8b and described above in detail with reference thereto.

Figures 11A, 11B:
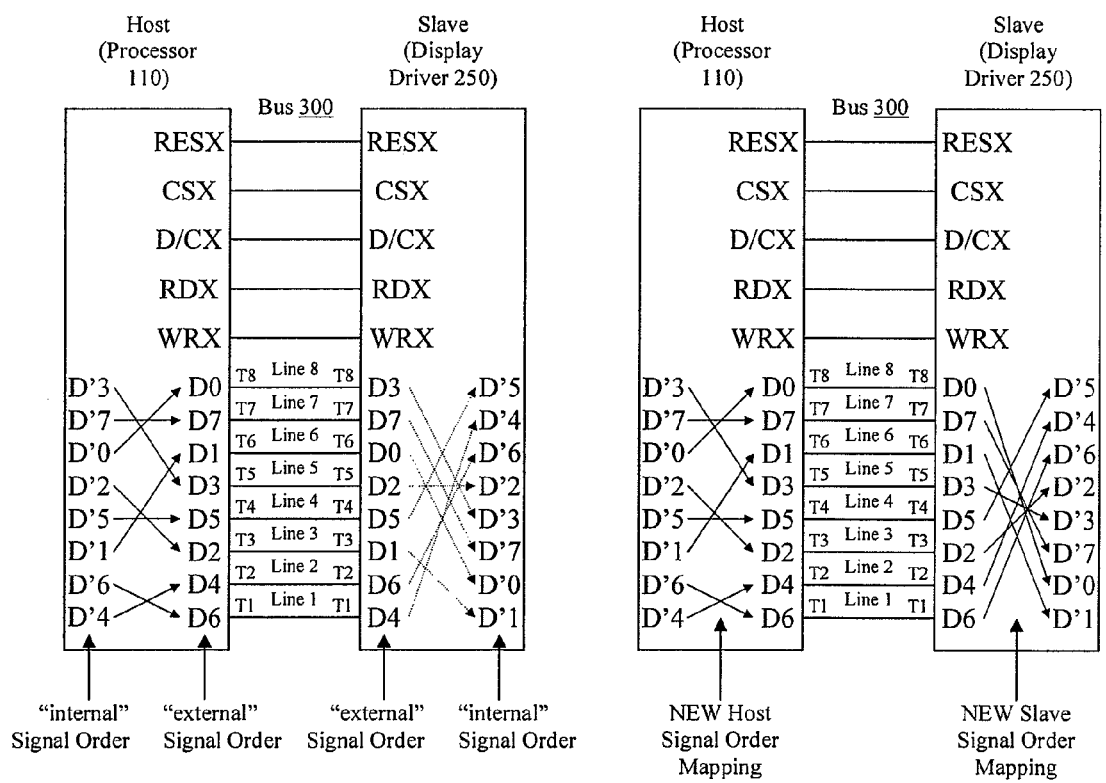
FIG. 11a illustrates a schematic block diagram showing external and internal signal order schemes and mapping schemes of host and slave components after re-configuration on host side according to an embodiment of the present invention.
FIG. 11b illustrates a schematic block diagram showing external and internal signal order schemes and mapping schemes of host and slave components after re-configuration on host side and slave side according to an embodiment of the present invention.

FIG. 11a schematically illustrates the state of mapping after initialization (S100, S110) and configuring of the mapping (S170; S10) in accordance with an embodiment of the present invention. With reference to FIG. 8b, the mapping unit provided with the slave component has obtained from the mapping parameters that line 1 carries data signal D[4] of the host interface, line 2 carries data signal D[6] of the host interface, line 3 carries data signal D[1] of the host interface and so on up to line 8 carrying data signal D[3] of the host interface. Hence, the host signal order in relation to the bus lines is known at the mapping unit provided with the slave component. The mapping logic 500 of the mapping unit is configured on the basis of the mapping parameters to map any signal on the multi-line bus having host signal order to slave signal order upon data signal reception and vice versa, from slave signal order to host signal order upon data signal transmission.

Now, the mapping at the host component is re-configured to a new host signal order (scheme). Line 1 carries data signal D[6] of the host interface, line 2 carries data signal D[4] of the host interface, and so on up to line 8 carrying data signal D[0] of the host interface. The new host signal order renders the signal mapping at the slave component inoperable. The re-configuration of the signal mapping at the slave component is required. The re-configuration of the mapping is performed in accordance with the aforementioned operations S310 to S360. The mapping parameters sent to the slave components for reconfiguration of the mapping allows the mapping unit provided with the slave component for identifying the new signal order scheme on side of the host component and the multi-line bus. Hence, the control logic 510 can re-configures the mapping logic 500 to map signals received from the multi-line bus having the new host signal order scheme to signals corresponding with the slave signal order scheme.

This new signal order mapping ensures that the mapping unit provided with the slave component switches signals carried on data line 1 to internal interface data signal D'[6], signals carried on line 2 to internal interface data signal D'[4], and so on up to signal carried on data line 8 to internal interface data signal D'[0]. This means that signals carried on data line 1 are interpreted as data signals D[6], signals carried on data line 2 are interpreted as data signals D[4], and so on up to signal carried on data line 8 being interpreted as data signal terminal D[0].

Configuration of the mapping provided on side of the slave component is arranged for mapping the data signals at the data signal lines of the bus to match the signal order of the slave interface. The mapping parameters received from the host component enables the mapping unit provided with the slave component to rearrange any data signals at the data signal lines such that the rearranged data signals have the required slave interface signal order.

Figure 12:
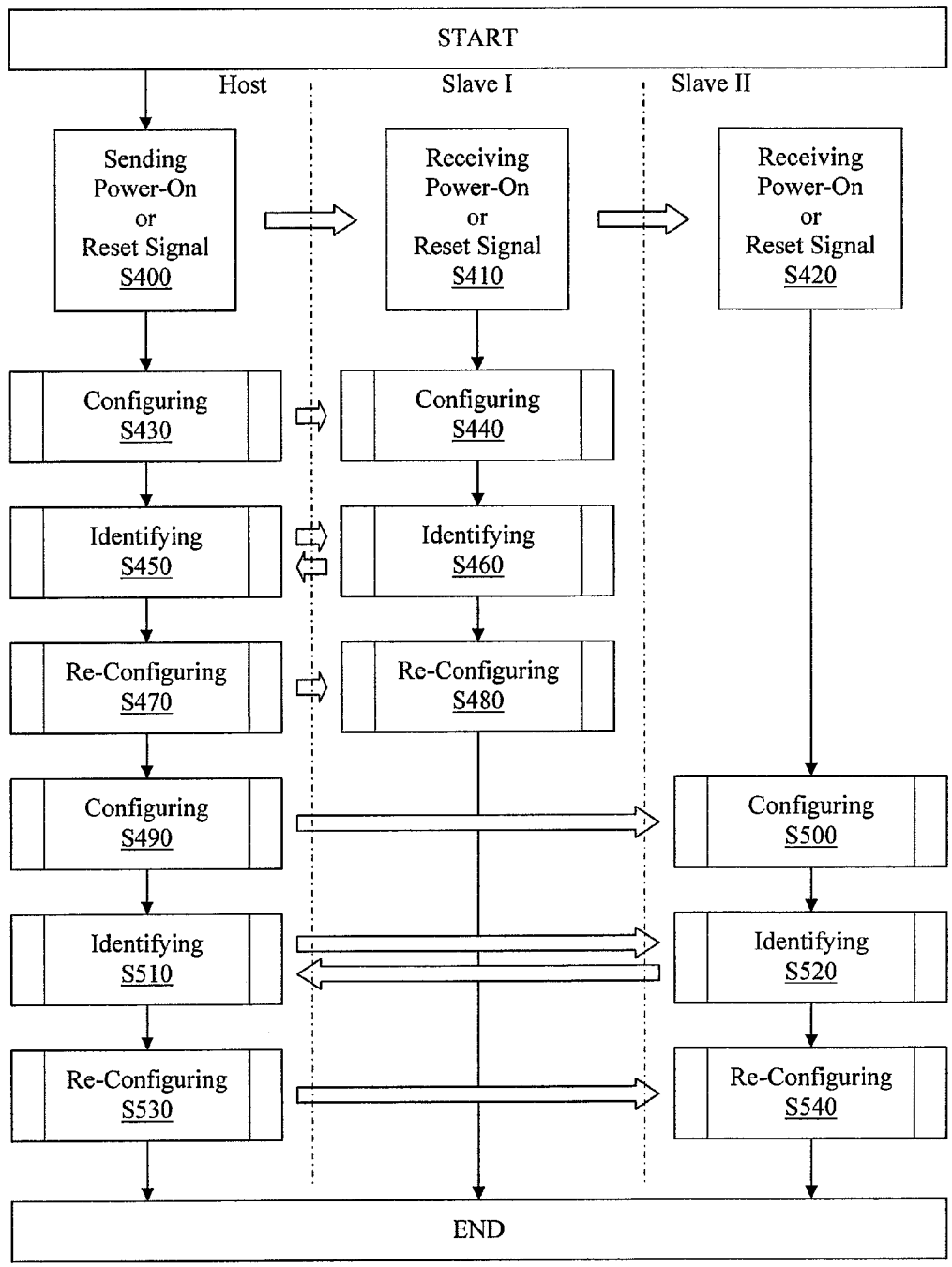
FIG. 12 illustrates a schematic more complex flow diagram of operations for performed at the electronic device comprising two slave components coupled to a common bus according to an embodiment of the present invention

A more complex example flow diagram according to an embodiment of the present invention is illustrated in FIG. 12 and will be described with reference to the schematic block diagrams shown in FIGS. 13*a* and 13*e*. The flow diagram of FIG. 12 illustrates a signal mapping configuration and signal mapping re-configuration of an electronic device 100 with a common multi-line bus to which a host component and two slave components are coupled according to an embodiment of the present invention. Such device architecture is exemplarily illustrated in FIG. 4*b* including a processor 110 operating as host component, a first display module I 210 operating as first slave component (slave 1) and a display module II 220 operating as second slave component (slave 2). The multi-line bus may be any parallel common bus such as one or the aforementioned buses 300. In particular, the common bus may be an Intel 80 parallel bus. Further, each of the host component and slave components may be equipped with a parallel CPU interface for image data transmission between the processor 110 and the display drivers 250 of the display modules 210 and 220. The Intel 80 parallel bus may have eight or sixteen data lines, herein is an Intel 80 parallel bus with 8 parallel data lines is illustratively shown. The display drivers 250 of the display modules 210 and 220 should be understood as being provided with mapping units for data signal mapping between the data signal order on the bus and the internal data signal order of the respective interface of the display drivers 250. For the sake of simplicity, FIGS. 13*b* to 13*e* only illustrates the signal order mapping at the interfaces of the first and second slave components with respect to the mapping configuration obtained different after operational steps shown in FIG. 12.

In operation S400, Power-on or (hardware/software) reset is signalized by the host component to both slave components, which receives the initialization signalization in operations S410 and S420, respectively.

Figure 13A:
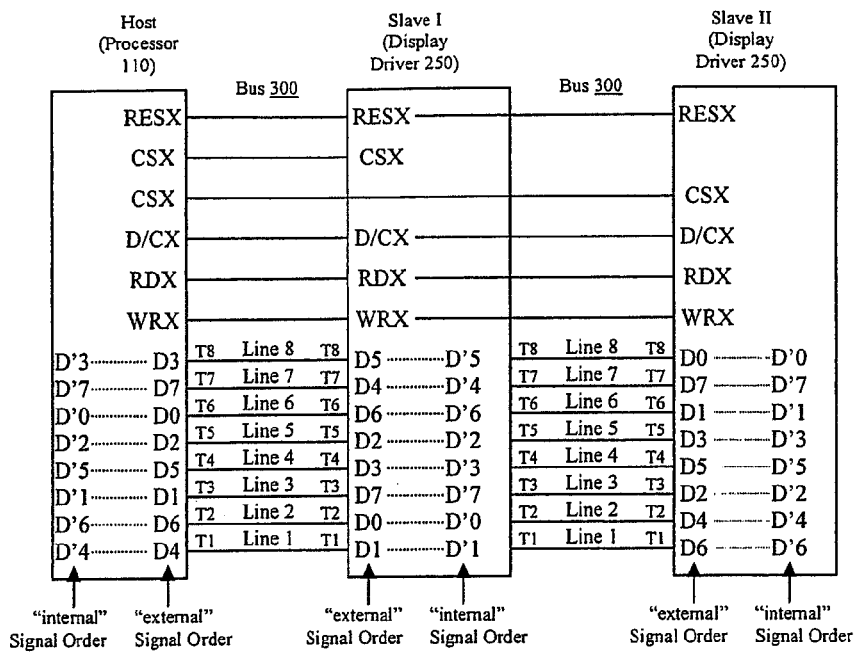
FIG. 13a illustrates a schematic block diagram showing external and internal signal order schemes and mapping schemes of host and slave components after initialization according to an embodiment of the present invention.

FIG. 13*a* illustrates the state of the signal mapping of the host component and first and second slave components after initialization according to an embodiment of the present invention. This means that signal mapping is not yet configured at any of the components. By default, the external signal order schemes of the components may correspond to the internal signal order schemes thereof. The control signals RESX, D/CX, RDX, and WRX of the interfaces of the components (processor 110 and display modules 210 and 220) are connected to each other via respective control signal bus lines. The individual slave modules (display modules 210 and 220) may be addressed by the host component via individual CSX control data signals each of which being connected through individual CSX control signal lines of the bus to either the first or second slave component.

The signal order schemes of the host component and the slave components differ from each other. Starting from line 1 of the bus and ending with line of the bus, the signal order scheme at the host interface on bus side is for example D[4], D[6], D[1], D[5], D[2], D[0], D[7], and D[3]; the signal order scheme at the first slave interface on bus side is for example D[1], D[0], D[7], D[3], D[2], D[6], D[4], and D[5]; and the signal order scheme at the second slave interface on bus side is for example D[6], D[4], D[2], D[5], D[3], D[1], D[7], and D[0]. The aforementioned "external" signal order schemes may correspond by default after initialization to "internal" signal order schemes of the respective interfaces of the host and slave components.

In an operation S430, the host component signalizes a configuration of the signal mapping to the first slave component and the first slave component configures its signal mapping correspondingly in an operation S440. The configuration of the signal mapping at the first slave component may be performed in accordance with the operation sequence described with reference to FIG. 7. The configuration of the signal mapping at the first slave component may hence comprise sending of mapping command and mapping parameters from the host component to the first slave component as described above in detail in accordance with embodiments of the present invention.

Figure 13B:
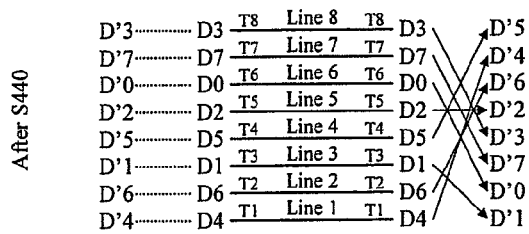
FIG. 13b illustrates a schematic block diagram showing external and internal signal order schemes and mapping schemes of host and slave components after configuration of the first slave component according to an embodiment of the present invention.

FIG. 13*b* illustrates the state of the signal mapping of the host component and first slave component after configuration of the signal mapping at the first slave component according to an embodiment of the present invention. The configuration of the second slave component is not changed and hence an illustration thereof is omitted in FIG. 13*b*. The "external" signal order scheme of the first slave component is adapted to the "external" signal order scheme of the host component, while the internal signal order scheme is maintained in relation to the internal circuitry of the first slave component, which is for instance herein D'[1], D'[0], D'[7], D'[3], D'[2], D'[6], D'[4], and D'[5]. The signal mapping is configured at the first slave component for mapping between the external host signal order scheme and the "internal" slave signal order scheme. This means that upon signal reception from the bus, signals on lines 1 to 8 are mapped to respective internal interface signal D'[4], D'[6], D'[1], D'[5], D'[2], D'[0], D'[7], and D'[3], respectively. Upon signal transmission, the inverse signal mapping is performed, which means that internal interface signals D'[1], D'[0], D'[7], D'[3], D'[2], D'[6], D'[4], and D'[5] are mapped to respective bus line 3, 6, 7, 8, 5, 2, 1, and 4, respectively.

In operations S450 and S460, the host component requests identification of the first slave component. The identification of the first slave component to the host component may enable the host component to instruct an individual adapted configuration of the mapping at the first slave component. The identification may be performed as described above with reference to FIG. 10a according to an embodiment of the present invention.

In operations S470 and S480, a re-configuration of the host signal mapping as well as the slave signal mapping of the first slave component is performed. The re-configuration may be performed as described above with reference to FIG. 10b according to an embodiment of the present invention.

Figure 13C:
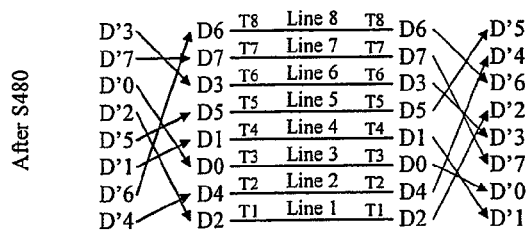
FIG. 13c illustrates a schematic block diagram showing external and internal signal order schemes and mapping schemes of host and slave components after re-configuration of the host and first slave components according to an embodiment of the present invention.

FIG. 13c illustrates the state of the signal mapping of the host component and first slave component after re-configuration of the signal mapping at both components according to an embodiment of the present invention. The configuration of the second slave component is again not changed and hence an illustration thereof is omitted in FIG. 13c. The "external" signal order scheme of the host component is changed in conjunction with the re-configuration of the signal mapping. The "external" signal order scheme of the host component is for instance altered to D[2], D[4], D[0], D[1], D[5], D[3], D[7], and D[6].

The "external" signal order scheme of the first slave component is adapted to the new "external" signal order scheme of the host component, while the internal signal order scheme is maintained in relation to the internal circuitry of the first slave component, which is still for instance D'[1], D'[0], D'[7], D'[3], D'[2], D'[6], D'[4], and D'[5]. The signal mapping is configured at the first slave component for mapping between the new external host signal order scheme and the fixed "internal" signal order scheme of the first slave component. This means that upon signal reception from the bus, signals on lines 1 to 8 are mapped to respective internal interface signal D'[2], D'[4], D'[0], D'[1], D'[5], D'[3], D'[7], and D'[6], respectively. Upon signal transmission, the inverse signal mapping is performed, which means that internal interface signals D'[1], D'[0], D'[7], D'[3], D'[2], D'[6], D'[4], and D'[5] are mapped to respective bus line 4, 3, 7, 6, 1, 8, 2, and 5, respectively.

In operations S490 and S500, a configuration of the slave signal mapping of the second slave component is performed. The re-configuration may be performed as described above with reference to FIG. 10b according to an embodiment of the present invention. The configuration of the signal mapping at the second slave component may be performed in accordance with the operation sequence described with reference to FIG. 7. Analogously, the configuration of the signal mapping at the second slave component may hence comprise sending of mapping command and mapping parameters from the host component to the second slave component as described above in detail in accordance with embodiments of the present invention. The signal order scheme, to which the signal mapping of the second slave component has to adapt, is herein for instance the "new" host signal order scheme, which is described above in detail. Alternatively, the host component may be re-configured to original or "internal" host order scheme prior to first configuration of the second slave component.

Figure 13D:
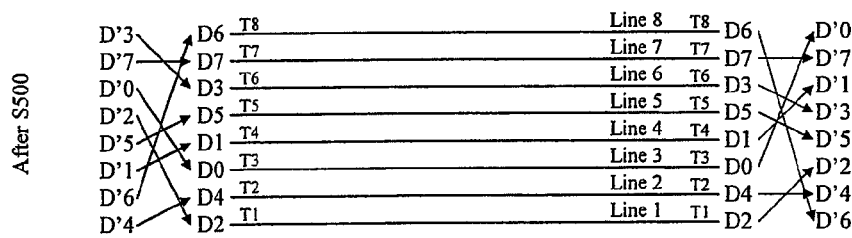
FIG. 13d illustrates a schematic block diagram showing external and internal signal order schemes and mapping schemes of host and slave components after configuration of the second slave component according to an embodiment of the present invention.

FIG. 13d illustrates the state of the signal mapping of the host component and second slave component after configuration of the signal mapping at the second slave component according to an embodiment of the present invention. The configuration of the first slave component is not changed and hence an illustration thereof is omitted in FIG. 13d. The "external" signal order scheme of the host component is the re-configured as described with reference to FIG. 13c according to an embodiment of the present invention. The "external" signal order scheme of the host component is for instance D[2], D[4], D[0], D[1], D[5], D[3], D[7], and D[6] with respect to the bus lines 1 to 8.

The "external" signal order scheme of the second slave component is configured to the current "external" signal order scheme of the host component, while the internal signal order scheme is maintained in relation to the internal circuitry of the second slave component, which is for instance D'[6], D'[4], D'[2], D'[5], D'[3], D'[1], D'[7], and D'[0]. The signal mapping is configured at the second slave component for mapping between the current external host signal order scheme and the fixed "internal" signal order scheme of the second slave component. This means that upon signal reception from the bus, signals on lines 1 to 8 are mapped to respective internal interface signal D'[2], D'[4], D'[0], D'[1], D'[5], D'[3], D'[7], and D'[6], respectively. Upon signal transmission, the inverse signal mapping is performed, which means that internal interface signals D'[6], D'[4], D'[2], D'[5], D'[3], D'[1], D'[7], and D'[0] are mapped to respective bus line 8, 2, 1, 5, 6, 4, 7, and 3, respectively.

In operations S510 and S520, the host component requests identification of the second slave component. The identification of the second slave component to the host component may enable the host component to instruct an individual adapted configuration of the mapping at the second slave component. The identification may be performed as described above with reference to FIG. 10a according to an embodiment of the present invention.

In operations S470 and S480, a re-configuration of the host signal mapping as well as the slave signal mapping of the second slave component is performed. The re-configuration may be performed as described above with reference to FIG. 10b according to an embodiment of the present invention.

Figure 13E:
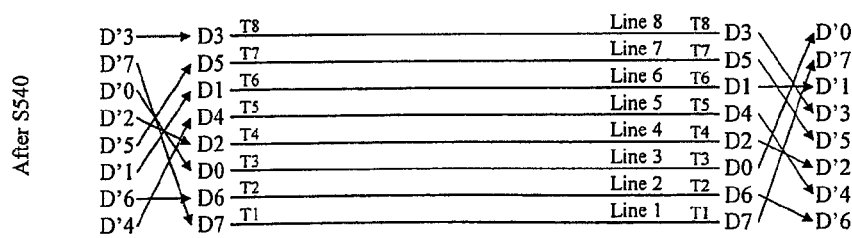
FIG. 13e illustrates a schematic block diagram showing external and internal signal order schemes and mapping schemes of host and slave components after re-configuration of the host and second slave components according to an embodiment of the present invention.

FIG. 13e illustrates the state of the signal mapping of the host component and second slave component after re-configuration of the signal mapping at both components according to an embodiment of the present invention. The configuration of the first slave component is again not changed and hence an illustration thereof is omitted in FIG. 13e. The "external" signal order scheme of the host component is changed in conjunction with the re-configuration of the signal mapping. The "external" signal order scheme of the host component is for instance altered to D[7], D[6], D[0], D[2], D[4], D[1], D[5], and D[3].

The "external" signal order scheme of the second slave component is re-configured to the new "external" signal order scheme of the host component, while the internal signal order scheme is again maintained in relation to the internal circuitry of the second slave component, which is still for instance D'[6], D'[4], D'[2], D'[5], D'[3], D'[1], D'[7], and D'[0]. The signal mapping is configured at the second slave component for mapping between the new external host signal order scheme and the fixed "internal" signal order scheme of the second slave component. This means that upon signal reception from the bus, signals on lines 1 to 8 are mapped to respective internal interface signal D'[7], D'[6], D'[0], D'[2], D'[4], D'[1], D'[5], and D'[3], respectively. Upon signal transmission, the inverse signal mapping is performed, which means that internal interface signals D'[6], D'[4], D'[2], D'[5], D'[3], D'[1], D'[7], and D'[0] are mapped to respective bus line 2, 5, 4, 7, 8, 6, 1, and 3, respectively.

The signal mapping of the first slave component may be adapted to the new "external" signal order scheme of the host component. Alternatively, the host component may re-configure to different signal mapping schemes individual for each slave component. Such host signal order schemes individual for each slave component allows for an enhanced flexibility in the selection of slave components even in case their original ("internal") signal order schemes differ from each other.

Hence, a skilled person will understand from the description above that the complexity of wiring layout of electronic devices, which are composed for several modular components, is significantly simplified and production costs are reduced due to reduction of the required conductive layers of PWBs. Moreover, the flexibility in configuring the signal order schemes at the interfaces allows for including module and components with the same functionality bus different terminal arrangements.

Furthermore, the configurability of the signal order schemes on bus side of interfaces allows for re-configuration during operation of the electronic device due to emerging interferences or crosstalk effects on one or more bus lines. Such effects may depend on operation mode of the electronic device. The re-configurability may remove the requirement that the developer has to ensure operation of the electronic device without interference and crosstalk effects in any operation modes. A simple re-configuration may be sufficient.

From the forgoing description, it will be apparent that modifications can be made to the system without departing from the teaching of the present invention. Accordingly, the scope of the invention is only to be limited as necessarily by the accompanying claims. In particular, alternative, different implementations of the permission table are also possible. The present invention should be understood as not being limited thereto.

The invention claimed is:

1. A method, comprising:
receiving mapping parameters through a first bus interface coupled to a multi-line bus, the mapping parameters identifying which signals are transmitted on at least a part of lines of the multi-line bus, the first bus interface being configured to expect to receive signals in a first signal order scheme in relationship to the lines of the multi-line bus;
detecting signals received via the multi-line bus from a second bus interface, the detected signals having a second signal order scheme of the second bus interface;
mapping the detected signals in accordance with the mapping parameters by rearranging the detected signals resulting in rearranged signals being in conformity with the first signal order scheme; and
receiving a mapping command for preparing the first bus interface to receive the mapping parameters, wherein the mapping command is selected to be independent of whether signal mapping is enabled or not.

2. The method of claim 1, further comprising:
mapping signals to be transmitted by the first bus interface via the multi-line bus in accordance with the mapping parameters by rearranging the signals to be transmitted being in conformity with the first signal order scheme resulting in rearranged signals being in conformity with the second signal order scheme; and
driving the rearranged signals on the multi-line bus.

3. The method of claim 1, further comprising:
receiving the mapping parameters by subsequently detecting a signal sequence in time, each signal being detected at a different line of the multi-line bus, the signal sequence being driven within a predefined period;
determining at which bus lines each signal has been detected; and
determining the second signal order scheme in dependence of the signal sequence in time and the determined bus lines on which the signals have been detected.

4. The method of claim 1, wherein the second bus interface transmits the mapping parameter by subsequently driving signals on at least the part of lines of the multi-line bus in an order which corresponds to the second signal order scheme.

5. A method, comprising:
transmitting mapping parameters from a first bus interface to a second bus interface via a multi-line bus coupling the first and second interfaces, the mapping parameters identifying which signals are carried on at least a part of lines of the multi-line bus, the second bus interface expecting to receive signals in a second signal order scheme in relationship to the lines of the multi-line bus;
instructing the second interface to apply the mapping parameters to any signals on the multi-line bus, wherein the signals on the multi-line bus being in conformity with the first signal order scheme, to map the signals in accordance with the mapping parameters by rearranging the detected signals resulting in rearranged signals being in conformity with the second signal order scheme; and
transmitting a mapping command for preparing the second bus interface to receive the mapping parameters, wherein the mapping command is selected to be independent of whether signal mapping at the second bus interface is enabled or not.

6. The method of claim 5, further comprising:
transmitting the mapping parameters by subsequently asserting a signal sequence in time, each signal of the signal sequence being asserted at a different line of the multi-line bus, the signal sequence being driven within a predefined period of time;
wherein each signal is asserted at a line of the multi-line bus in accordance with the first signal order scheme; and
wherein the second signal order scheme is determinable in dependence of the signal sequence in time and the bus lines on which the signals are asserted.

7. The method of claim 5, further comprising:
configuring a new first signal order scheme at the first bus interface; mapping signals to be transmitted by the first bus interface by rearranging the signals to be transmitted being in conformity with the first signal order scheme resulting in rearranged signals being in conformity with the new first signal order scheme; and asserting the rearranged signals at the multi-line bus.

8. An apparatus, comprising:
a control logic, which is configured to receive mapping parameters through a first bus interface coupled to a multi-line bus, the mapping parameters identifying which signals are transmitted on at least a part of lines of the multi-line bus, the first bus interface expecting to receive signals in a first signal order scheme in relationship to the lines of the multi-line bus;
a mapping logic, which is configured to detect signals received via the multi-line bus from a second bus interface, the detected signals having a second signal order scheme of the second bus interface;
the mapping logic being configured to map the detected signals in accordance with the mapping parameters by rearranging the detected signals resulting in rearranged signals being in conformity with the first signal order scheme; and a trigger logic, which is configured to receive a mapping command for preparing the first bus interface to receive the mapping parameters, wherein the mapping command is selected to be independent of whether signal mapping is enabled or not.

9. The apparatus of claim 8, further comprising:

the mapping logic, which is configured to map signals to be transmitted by the first bus interface via the multi-line bus in accordance with the mapping parameters by rearranging the signals to be transmitted being in conformity with the first signal order scheme resulting in rearranged signals being in conformity with the second signal order scheme; and the mapping logic, which is configured to drive the rearranged signals on the lines of the multi-line bus.

10. The apparatus of claim 8, further comprising:

the mapping logic, which is configured to receive the mapping parameters by subsequently detecting a signal sequence in time, each signal being detected at a different line of the multi-line bus, the signal sequence being driven within a predefined period;

the mapping logic, which is configured to determine at which bus lines each signal has been detected; and the mapping logic, which is configured to determine the second signal order scheme in dependence of the signal sequence in time and the determined bus lines on which the signals have been detected.

11. The apparatus of claim 8, wherein the second bus interface is configured to transmit the mapping parameter by subsequently driving signals on at least the part of lines of the multi-line bus in an order which corresponds to the second signal order scheme.

12. An apparatus, comprising:

a first bus interface;

a control means being configured to receive mapping parameters through the first bus interface coupled to a multi-line bus, the mapping parameters identifying which signals are transmitted on at least a part of lines of the multi-line bus, the first bus interface expecting to receive signals in a first signal order scheme in relationship to the lines of the multi-line bus;

a mapping means being configured to detect signals received via the multi-line bus from a second bus interface, the detected signals having a second signal order scheme of the second bus interface;

the mapping means being configured to map the detected signals in accordance with the mapping parameters by rearranging the detected signals resulting in rearranged signals being in conformity with the first signal order scheme; and the control logic, which is configured to transmit a mapping command for preparing the second bus interface to receive the mapping parameters, wherein the mapping command is selected to be independent of whether signal mapping at the second bus interface is enabled or not.

13. An apparatus, comprising:

a first bus interface;

a control logic, which is configured to transmit mapping parameters from the first bus interface to a second bus interface via a multi-line bus coupling the first and second interfaces, the mapping parameters identifying which signals are carried on at least a part of lines of the multi-line bus, the second bus interface expecting to receive signals in a second signal order scheme in relationship to the lines of the multi-line bus; and the control logic, which is configured to instruct the second interface to apply the mapping parameters to any signals on the multi-line bus, wherein the signals on the multi-line bus being in conformity with the first signal order scheme, to map the signals in accordance with the mapping parameters by rearranging the detected signals resulting in rearranged signals being in conformity with the second signal order scheme;

the control logic, which is configured to configure a new first signal order scheme at the first bus interface;

a mapping logic, which is configured to map signals to be transmitted by the first bus interface by rearranging the signals to be transmitted being in conformity with the first signal order scheme resulting in rearranged signals being in conformity with the new first signal order scheme; and the mapping logic, which is configured to assert the rearranged signals at the multi-line bus.

14. The apparatus of claim 13, further comprising:

the control logic, which is configured to transmit the mapping parameters by subsequently asserting a signal sequence in time, each signal of the signal sequence being asserted at a different line of the multi-line bus, the signal sequence being driven within a predefined period of time;

wherein each signal is asserted at a line of the multi-line bus in accordance with the first signal order scheme; and wherein the second signal order scheme is determinable in dependence of the signal sequence in time and the bus lines on which the signals are asserted.

15. An apparatus, comprising:

a first bus interface;

control means being configured to transmit mapping parameters from the first bus interface to a second bus interface via a multi-line bus coupling the first and second interfaces, the mapping parameters identifying which signals are carried on at least a part of lines of the multi-line bus, the second bus interface being configured to expect to receive signals via the multi-line bus in a second signal order scheme in relationship to the lines of the multi-line bus;

the control means being configured to instruct the second interface to apply the mapping parameters to any signals on the multi-line bus, wherein the signals on the multi-line bus being in conformity with the first signal order scheme, to map the signals in accordance with the mapping parameters by rearranging the detected signals resulting in rearranged signals being in conformity with the second signal order scheme;

the control means, which is configured to configure a new first signal order scheme at the first bus interface;

a mapping means, which is configured to map signals to be transmitted by the first bus interface by rearranging the signals to be transmitted being in conformity with the first signal order scheme resulting in rearranged signals being in conformity with the new first signal order scheme; and the mapping means, which is configured to assert the rearranged signals at the multi-line bus.

16. A system, comprising:

a multi-line bus;

a first component having a first bus interface coupled to the multi-line bus; and a second component having a second bus interface coupled to the multi-line bus; wherein the first component further comprises:

a control logic, which is configured to transmit mapping parameters from the first bus interface to the second bus interface via the multi-line bus, the mapping parameters identifying which signals are carried on at least a part of lines of the multi-line bus; and the first interface, which is adapted to transmit signal being in conformity with a first signal order scheme;

wherein the second component further comprises:
a control logic, which is configured to receive the mapping parameters through the second bus interface, the second bus interface being configured to expect to receive signals in a second signal order scheme in relation to the lines of the multi-line bus;
a mapping logic, which is configured to detect the signals transmitted by the first bus interface; and
the mapping logic, which is configured to map the detected signals in accordance with the mapping parameters by rearranging the detected signals resulting in rearranged signals being in conformity with the second signal order scheme.

* * * * *